(12) United States Patent
Dressick et al.

(10) Patent No.: US 9,895,713 B2
(45) Date of Patent: Feb. 20, 2018

(54) POLYELECTROLYTE MULTILAYERS HAVING SALT-CONTROLLED INTERNAL STRUCTURES

(71) Applicants: Walter J. Dressick, Waldorf, MD (US); Kathryn J. Wahl, Alexandria, VA (US); Dmitri Y. Petrovykh, Braga (PT); Nabil D. Bassim, Silver Spring, MD (US); Rhonda Michelle Stroud, Washington, DC (US)

(72) Inventors: Walter J. Dressick, Waldorf, MD (US); Kathryn J. Wahl, Alexandria, VA (US); Dmitri Y. Petrovykh, Braga (PT); Nabil D. Bassim, Silver Spring, MD (US); Rhonda Michelle Stroud, Washington, DC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 805 days.

(21) Appl. No.: 14/198,655

(22) Filed: Mar. 6, 2014

(65) Prior Publication Data

US 2014/0242376 A1 Aug. 28, 2014

Related U.S. Application Data

(63) Continuation-in-part of application No. 14/147,098, filed on Jan. 3, 2014.

(Continued)

(51) Int. Cl.
*B32B 7/02* (2006.01)
*B05D 1/36* (2006.01)
(Continued)

(52) U.S. Cl.
CPC ............... *B05D 1/36* (2013.01); *B05D 7/52* (2013.01); *B05D 7/56* (2013.01); *C09D 125/18* (2013.01);
(Continued)

(58) Field of Classification Search
CPC ............ B82Y 10/00; B82Y 30/00; B32B 7/02
(Continued)

(56) References Cited

U.S. PATENT DOCUMENTS 8,435,773 B2 * 5/2013 Worden ................. B82Y 30/00
204/403.14
2006/0159901 A1 * 7/2006 Tischler .................... B32B 7/02
428/212

(Continued)

OTHER PUBLICATIONS

Bassim et al., "Layer-by-Layer Assembly of Heterogeneous Modular Nanocomposites" J. Phys. Chem. C 2012, 116, 1694-1701 (Jan. 5, 2012).

(Continued)

*Primary Examiner* — Khanh Tuan Nguyen
(74) *Attorney, Agent, or Firm* — US Naval Research Laboratory; Joseph T. Grunkemeyer

(57) ABSTRACT

A method, and an article made therefrom, of: contacting a substrate with a first solution of a first polyelectrolyte polymer to form a layer of the first polyelectrolyte polymer on the substrate; and contacting the layer of the first polyelectrolyte polymer with a second solution of a second polyelectrolyte polymer to form a layer of the second polyelectrolyte polymer on the layer of the first polyelectrolyte polymer. The first polyelectrolyte is a polyanion or polycation polymer. The second polyelectrolyte is a polyanion or polycation polymer of a charge opposite to that of the first polyelectrolyte polymer. At least one of the first solution or the second solution is an aggregate-forming solution comprising an ionic species having at least two discrete sites of a charge opposite to that of the polyelectrolyte polymer in the aggregate-forming solution. The ionic species forms, via bridging interactions, aggregates of the polyelectrolyte polymer that remain intact in the aggregate-forming solution during the contact and layer formation.

16 Claims, 13 Drawing Sheets

Related U.S. Application Data

(60) Provisional application No. 61/748,997, filed on Jan. 4, 2013.

(51) Int. Cl.
  | | |
  |---|---|
  | *C09D 125/18* | (2006.01) |
  | *C09D 139/02* | (2006.01) |
  | *C09D 133/02* | (2006.01) |
  | *B05D 7/00* | (2006.01) |
  | *B05D 1/18* | (2006.01) |

(52) U.S. Cl.
  CPC ......... *C09D 133/02* (2013.01); *C09D 139/02* (2013.01); *B05D 1/185* (2013.01); *Y10T 428/249981* (2015.04); *Y10T 428/31612* (2015.04); *Y10T 428/31663* (2015.04); *Y10T 428/31935* (2015.04)

(58) Field of Classification Search
  USPC ...................................... 204/403.14; 428/212
  See application file for complete search history.

(56) References Cited

U.S. PATENT DOCUMENTS

| | | |
|---|---|---|
| 2009/0010980 A1 | 1/2009 | Singh et al. |
| 2013/0009825 A1* | 1/2013 | Lee ..................... B82Y 10/00 |
| | | 343/700 MS |
| 2014/0193644 A1 | 7/2014 | Dressick et al. |

OTHER PUBLICATIONS

Bassim et al., "Electron Microscopy of Modular Layer-by-Layer PAH/PSS-Au Nanocomposite Structures" 2010 MRS Fall Meeting (Dec. 3, 2010).

Brunner et al. "Biomimetic synthesis of silica nanospheres depends on the aggregation and phase separation of polyamines in aqueous solution" Phys. Chem. Chem. Phys., 2004, 6, 854-857.

Dragan et al., "Influence of low-molecular-weight salts on the formation of polyelectrolyte complexes based on polycations with quatemary ammonium salt groups in the main chain and poly(sodium acrylate)" European Polymer Journal 37 (2001) 1571-1575.

Dressick et al., "Divalent?Anion Salt Effects in Polyelectrolyte Multilayer Depositions" Langmuir 2012, 28, 15831-15843.

Ghimici et al., "Behaviour of cationic polyelectrolytes upon binding of electrolytes: effects of polycation structure, counterions and nature of the solvent" Colloid Polym Sci 280:130-134 (2002).

Kioussis et al., "Phosphate binding polymeric hydrogels for aquaculture wastewater remediation" Aquacultural Engineering 19 (1999) 163-178.

Kovacevic et al., "The influence of ionic strength, electrolyte type and preparation procedure on formation of weak polyelectrolyte complexes" Colloids and Surfaces A: Physicochem. Eng. Aspects 302 (2007) 107-112.

Kovacevic et al., "Kinetics of Formation and Dissolution of Weak Polyelectrolyte Multilayers: Role of Salt and Free Polyions" Langmuir 2002, 18, 5607-5612.

Kovacevic et al., "Specific Ionic Effects on Weak Polyelectrolyte Multilayer Formation" J. Phys. Chem. B 2003, 107, 1998-8002.

Murthy et al., "Nanoparticle-Assembled Capsule Synthesis: Formation of Colloidal Polyamine-Salt Intermediates" J. Phys. Chem. B 2006, 110, 25619-25627.

Tikhonenenko et al., "Enzyme-Polyelectrolyte Complex: Salt Effects on the Reaction of Urease with Polyallylamine" Russian Journal of Physical Chemistry A, 2009, vol. 83, No. 10, pp. 1781-1788.

Wang et al., "Conformational Behavior of Grafted Weak Polyelectrolyte Chains: Effects of Counterion Condensation and Nonelectrostatic Anion Adsorption" Langmuir 2011, 27, 9895-9901.

Yu et al., "Synthesis of Near-Infrared-Absorbing Nanoparticle-Assembled Capsules" Chem. Mater. 2007, 19, 1277-1284.

Office Action in U.S. Appl. No. 14/147,098 (dated Oct. 4, 2016).

Office Action in U.S. Appl. No. 14/147,098 (dated Jul. 17, 2017).

* cited by examiner

Quartz Slide

Absorbance  Emission

Si Wafer

Absorbance  Emission

US 9,895,713 B2

POLYELECTROLYTE MULTILAYERS HAVING SALT-CONTROLLED INTERNAL STRUCTURES

This application is a continuation-in-part application of pending U.S. Nonprovisional application Ser. No. 14/147,098, filed on 3 Jan. 2014, which claims the benefit of U.S. Provisional Application No. 61/748,997, filed on 4 Jan. 2013. These applications and all other publications and patent documents referred to throughout this application are incorporated herein by reference.

TECHNICAL FIELD

The present disclosure is generally related to polyelectrolyte multilayers (PEMLs).

DESCRIPTION OF RELATED ART

Polyelectrolyte multilayers are films formed via repetitive, alternating treatment of a substrate with polycation- and polyanion-containing solutions. Electrostatic attraction between the solution polyelectrolyte and oppositely-charged polyelectrolyte already adsorbed to the substrate binds the solution polyelectrolyte to the adsorbed polyelectrolyte at the film-solution interface. The process cycle is driven by steric effects that prevent complete neutralization of the charge on the incoming polyelectrolyte during adsorption, leading to a surface charge reversal that facilitates adsorption of the next (oppositely charged) polyelectrolyte layer.

The multilayer deposition process is governed by a variety of factors, including but not limited to polyelectrolyte solution pH, ionic strength, and temperature, as well as polyelectrolyte molecular weight, chemistry (i.e., nature of the polyelectrolyte chemical functional groups), and deposition method (e.g., dipcoating vs. spincoating vs. spraycoating). Polyelectrolyte layers can presently be deposited onto the growing multilayer film in the form of two limiting morphologies. In the first, each polyelectrolyte is deposited as a separate layer, with roughly equivalent amounts of polycation and polyanion deposited in each deposition cycle. Though some interpenetration of the chains of the incoming polyelectrolyte with those of the adsorbed polyelectrolyte comprising the terminal layer of the growing multilayer film can occur, in general individual polycation and polyanion strata are observed. Within an individual polyelectrolyte layer, polyelectrolyte chains are predominantly unordered and exist in random mixed linear and/or coiled conformations.

The second limiting morphology is produced when at least one of the polyelectrolytes exhibits enhanced diffusivity within the multilayer stack. This leads to a non-linear (i.e., exponential) growth behavior in which the amounts of each polyelectrolyte deposited increase with deposition of each layer (i.e., as film thickness increases). As a result, complete or nearly complete mixing of the polycation and polyanion components of the multilayer occurs. Such multilayers exhibit relatively uniform distributions of mixed polycation and polyanion chains throughout the thickness of the multilayer stack, rather than the individual polycation and polyanion strata observed in linearly grown films.

In both morphologies, individual organized structures of polycation and/or polyanion are typically not observed. Each polyelectrolyte is present as random interwoven linear or coiled chains. For the stratified deposition, polyelectrolyte chains are randomly mixed with chains of other identical polyelectrolyte in a given stratum for the most part. In contrast, for exponentially grown multilayers, polyelectrolyte chains of oppositely charged polyelectrolytes are randomly intermixed throughout the multilayer stack.

Non-random internal structure within a multilayer stratum, in which polyelectrolyte chains are spatially organized within the stratum, currently requires use of organizing agents as film additives. For example, adsorption of a polycation to anionic surface sites naturally present on a silica nanoparticle leads to a hybrid core-shell material in which the curved silica surface templates the curvature and controls the shape of the adsorbed polycation. Adsorption of this hybrid species (by virtue of excess positive charge associated with cationic sites of the polycation not bound to the anionic sites of the silica nanoparticle) can occur onto a terminal polyanion layer of a growing multilayer film. Subsequent adsorption of another layer of the polyanion to the bound polycation-silica hybrid layer provides an encapsulated polycation-silica layer in which the polycation conformation is determined in large part by the silica nanoparticle template. Dissolution of the silica using HF or other reagents can leave behind the spatially organized polycation within the film. Similar structures can be envisioned using polyelectrolyte-coated Au nanoparticles, following Au dissolution using cyanide or related reagents within the completed multilayer film. As nanoparticles can be prepared in various shapes and sizes, a degree of control over the packing, spatial distribution, and structure/shape of the templated polyelectrolyte layer following template dissolution can be achieved. Other methods of controlling the internal film structure that use heterogeneous templates have been demonstrated as well, including hollow nano-to-microscale tubes (or other constructs having internal porosity) and nano-to-micro-scale templates that are attached to a substrate, which allows the template to be mechanically removed after film deposition. Alternate methods to control and fix polyelectrolyte structure within a multilayer stratum without relying on "dissolvable" (or otherwise removable) templates, which are necessarily composed of materials other than the constituent polyelectrolytes, do not exist.

BRIEF SUMMARY

Disclosed herein is a method comprising: contacting a substrate with a first solution comprising a first polyelectrolyte polymer to form a layer of the first polyelectrolyte polymer on the substrate; and contacting the layer of the first polyelectrolyte polymer with a second solution comprising a second polyelectrolyte polymer to form a layer of the second polyelectrolyte polymer on the layer of the first polyelectrolyte polymer. The first polyelectrolyte polymer is a polyanion or polycation polymer. The second polyelectrolyte polymer is a polyanion or polycation polymer of a charge opposite to that of the first polyelectrolyte polymer. At least one of the first solution or the second solution is an aggregate-forming solution comprising an ionic species having at least two discrete sites of a charge opposite to that of the polyelectrolyte polymer in the aggregate-forming solution. The ionic species forms, via bridging interactions, aggregates of the polyelectrolyte polymer that remain intact in the aggregate-forming solution and at least partially intact during the contact and layer formation.

Also disclosed herein is an article made by the above method.

DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
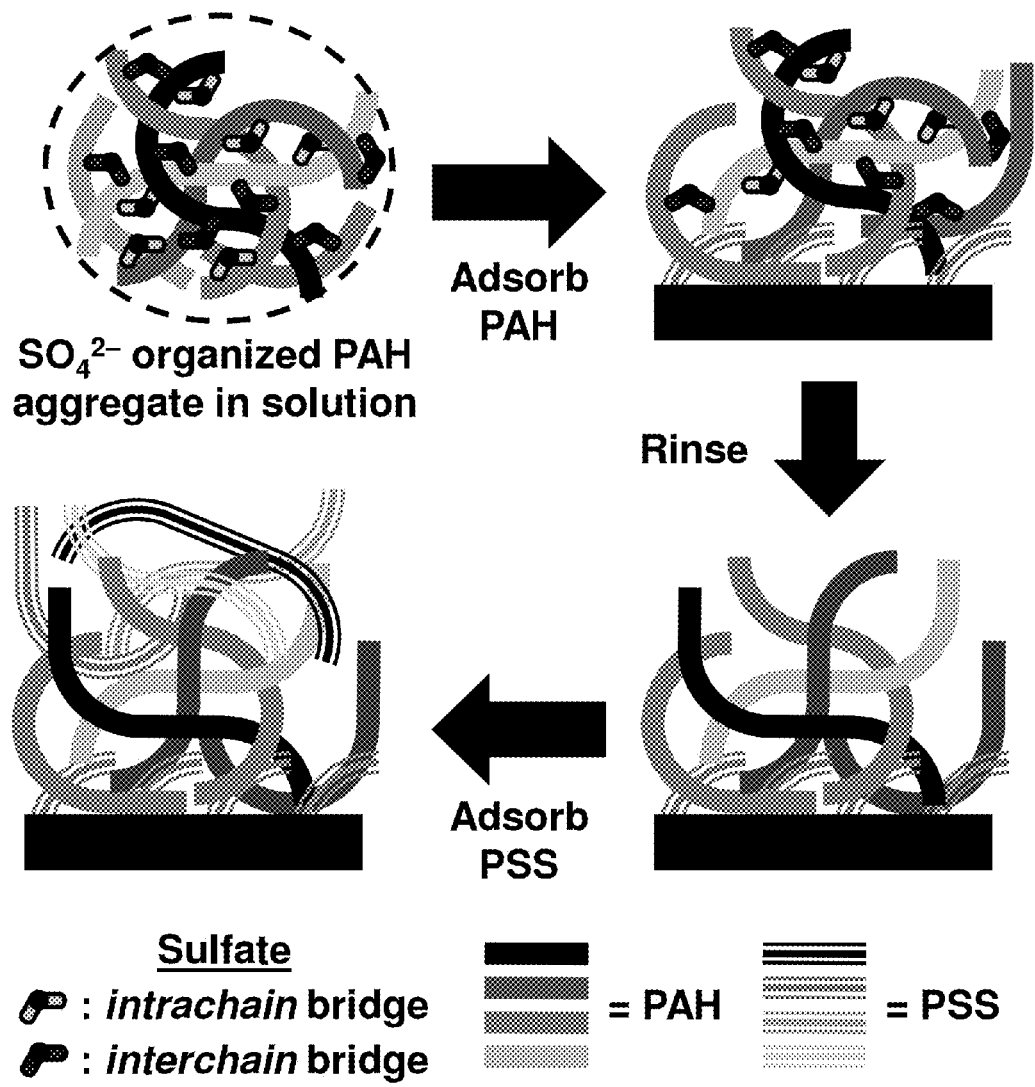
FIG. 1 shows an anion-bridging model for the fabrication of PEMLs (e.g., PSS (sodium polystyrene sulfonate)/PAH (polyallylamine hydrochloride)) from polyelectrolyte solutions containing sulfate and related divalent bridging-anion salts. (The various shades of polyelectrolyte strands serve solely to illustrate the chain entanglement described by the model.)

In the following description, for purposes of explanation and not limitation, specific details are set forth in order to provide a thorough understanding of the present disclosure. It will be apparent to one skilled in the art, however, that the present subject matter may be practiced in other embodiments that depart from these specific details. In other instances, detailed descriptions of well-known methods and devices are omitted, to avoid obscuring the present disclosure with unnecessary details.

Disclosed herein is an alternate method of controlling the internal structure of polyelectrolyte multilayers whereby anions capable of electrostatically bridging cationic sites on polycation chains in solution organize said polycation chains into solution aggregates. Polycation aggregate size and solution concentration are tuned by the concentration and nature of the bridging anion present in the polycation deposition solution. The anion-bridged aggregates of polycation are sufficiently stable to adsorb predominantly or at least partially intact onto the polyanion terminal layer of a growing multilayer. The adsorbed aggregates control the surface morphology of the stratum that they comprise by virtue of their size (i.e., steric effects) and charge (i.e., electrostatic effects), which determine their surface coverage and spatial distribution at the film-solution interface. Spaces between adjacent adsorbed aggregates constitute defect sites, which are covered by subsequent adsorption of the next polyanion layer as film growth proceeds. As a result, a multilayer film having a controllable unique porous internal defect structure is fabricated. The components of bridging-anion salts may be readily removed from the adsorbed polycation aggregates by the rinsing process used during film fabrication. Therefore, the fabrication of the internal structure does not require the use of harsh chemical dissolution steps associated with the templates currently used to prepare similar films. Furthermore, as the internal structure is created by the polyelectrolyte constituents of the multilayer, this method is advantageous for applications where the presence of heterogeneous templates or their residues is undesirable (e.g., due to health or environmental regulations).

The polyelectrolyte multilayer films may exhibit controllable, unique, internal defect structures and morphologies if the salt of an anion having two or more discrete negatively-charged sites, closely spaced and rigidly fixed at an obtuse angle with respect to each other, is present in the polyelectrolyte solutions during multilayer deposition. Specifically, anions having at least two discrete negatively-charged sites can electrostatically interact with oppositely charged sites on polycation chains, leading to intrachain and interchain bridging. Aggregate structures are formed via bridging anion interactions with the polycation in solution and these aggregates are sufficiently stable that they are adsorbed predominantly or at least partially intact onto the oppositely charged polyanion layer already present on the substrate surface during multilayer fabrication.

In contrast univalent anions are unable to establish such bridging interactions with the polycation chains in solution. Univalent anions, however, can electrostatically bind to individual cationic sites on the polycation chain. This binding partially neutralizes the charge of the polycation chain. As a result, electrostatic repulsion among the positively-charged sites on the chain is also reduced, permitting weaker van der Waals and hydrogen bonding interactions to increasingly dictate chain conformation. These weaker interactions lead to chain coiling and association of polyelectrolyte chains in solution, resulting in the formation of loosely aggregated, fluxional polyelectrolyte species. Because such aggregates are weakly associated, they do not maintain their solution structure upon adsorption to the surface, unlike the more stable aggregates formed using the bridging anion species. An analogous argument applies to polyanion aggregates formed via associations between the polyanion and univalent cations (or non-bridging multivalent cations) in the solutions.

Because the polycation aggregates formed via bridging anions remain predominantly or at least partially intact upon adsorption, their presence on the surface can impede and control further adsorption of aggregates from solution due to like-charge and steric repulsion effects. Therefore, defect or void sites are formed on the surface during polycation aggregate adsorption. Subsequent adsorption of polyanion aggregates from solution onto these polycation aggregates readily occurs. However, the loose, weakly interacting polyanion aggregates present in solutions cannot maintain their solution structure during the adsorption process. Consequently, they are sufficiently fluxional following adsorption to the polycation aggregates on the surface that they can (partially or fully) cover the void or defect sites present in the underlying polycation aggregate layer. As a result, the surface defects are "healed" as increasing numbers of polycation and polyanion layers are deposited during multilayer fabrication. This deposition process leads to a multilayer having an internal structure comprised of layers of stacked polycation aggregates separated and held together by layers of polyanion strands, creating a unique internal porosity.

Figure 7:
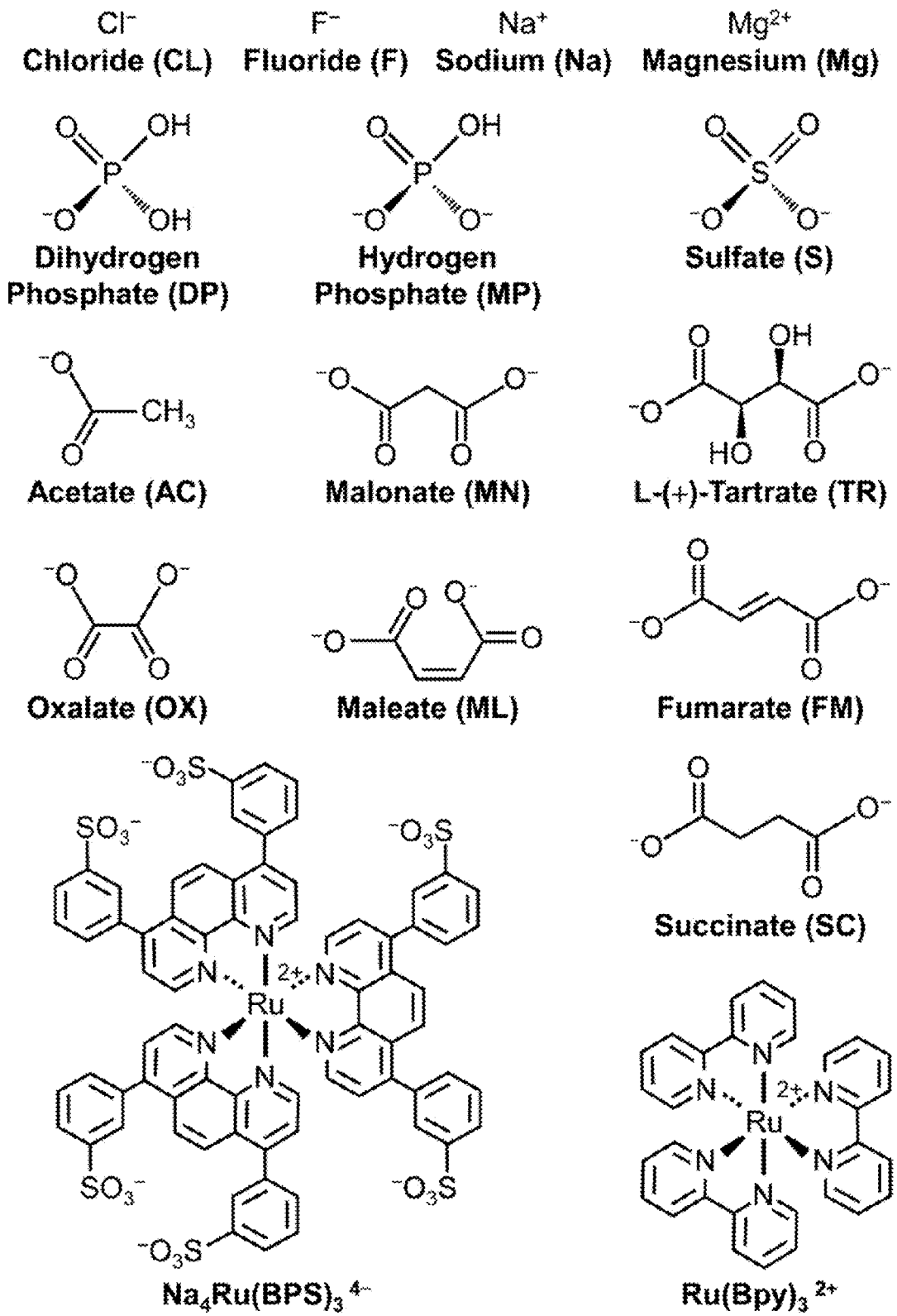
FIG. 7 shows structures and abbreviations of the ions used herein.

Bridging multivalent anions that are useful for stabilizing polycation aggregate structures in solution sufficiently well to permit their predominantly intact adsorption onto the substrate during multilayer fabrication include, but are not limited to, sulfate, monohydrogen phosphate, phosphate, and various organic dicarboxylates, such as oxalate, maleate, tartrate, malonate, fumarate, and succinate (FIG. 7). Other multivalent carboxylate species, such as citrate, ethylenediaminetetraacetic acid (EDTA), or phthalates, should also function similarly, as should various catechols having deprotonated hydroxyl sites or transition metal complexes having multiple peripheral ligand anionic sites properly and rigidly separated and angled with respect to one another other. Among the organic dicarboxylates, structures having discrete negatively charged sites closely and rigidly spaced relative to each other at an obtuse angle may be effective in stabilizing the polycation aggregates. Thus, oxalate provides polycation aggregates of similar stability to those of sulfate, whereas succinate, in which the carboxylate groups are not rigidly fixed relative to each other and are spaced further apart than for oxalate (FIG. 7), functions as a poorer stabilizer for polycation aggregates.

The use of bridging multivalent anions that are the most capable of stabilizing the polycation solution aggregates during multilayer deposition, such as sulfate or monohydrogen phosphate, yields multilayers having the most and largest polycation aggregates adsorbed to the film during deposition of each polycation layer. This permits some control of the numbers and sizes of the defect sites creating the internal structure of the multilayer film. In addition, the use of bridging multivalent anions leads to control of multilayer film thickness, roughness, and related properties. Consequently, the concentration and nature of the bridging multivalent anion present in the polyelectrolyte solutions during multilayer deposition permits tuning of multilayer structure and properties.

There is no valid reason that analogously structured multilayer films from polyanions using bridging cations could not or would not exist, provided that an appropriate bridging cation can be found. Small, multivalent rigid cations having discrete cationic sites closely and rigidly spaced apart from each other at a fixed obtuse angle are rare compared to analogous bridging anions. However, there are a few organic molecules that may be adequate for this purpose. Some possible candidates would include sufficiently water-soluble multiamine containing materials such as protonated or alkylated (quaternary) ethylenediamine or melamine, as well as various methyl viologen isomers having the proper non-linear orientation of their alkylated N sites and transition metal complexes whose ligands have cationic sites fixed to their peripheries.

The method disclosed herein permits fabrication of multilayer films having unique porous internal defect structures and film morphologies simply via choice and concentration of the multivalent bridging salt anion present in the polyelectrolyte solutions during multilayer deposition. Compared to current approaches requiring the use of a dissolution step to remove hard templates used for fabrication of similar films, the method offers at least three potential advantages. First, the use of added salts containing bridging anions to control polycation solution aggregation, and therefore ultimately internal multilayer structure, requires no use of harsh chemical agents to dissolve the template. This is an advantage for multilayer films which may have functional groups sensitive to the acids, bases, or other dissolution agent often used for this purpose. One such example would be a multilayer in which a polypeptide is present as one of the polyelectrolyte components. Hydrolysis of the polypeptide amide bonds by acid or base would degrade or destroy the polypeptide strata, and therefore also the multilayer film. Second, the bridging anion salt is readily removed during the standard rinsing protocol used to fabricate the multilayer films. If the presence of the bridging anion in the completed multilayer is desired, it is readily accomplished by modification of the rinse procedures used during film fabrication. Finally, as the internal structure is created by the polyelectrolyte constituents of the multilayer, this method is advantageous for applications where the presence of heterogeneous templates or their residues is undesirable (e.g., due to health or environmental regulations).

Given their unique internal structures, the films may be useful for filtration and encapsulation applications. In addition, the use of the internal defect sites as nanoreactors for conducting chemical reactions within their ultra-small volumes inside the multilayer film is also possible. Because there is no known analogous method available for providing such a controllable unique internal defect structure within a polyelectrolyte multilayer film (particularly for films <500 nm in thickness), the films are expected to find great use in these areas.

The simplest model for PSS/PAH multilayer growth, derived from observations in solutions with $SO_4^{2-}$ (but generalizable to other bridging anions), is illustrated in FIG. 1. In this model, film growth is controlled by the compact and stable PAH solution aggregates formed via the intra- and interchain electrostatic interactions of PAH protonated amine sites with $SO_4^{2-}$ dianion species. These PAH aggregates remain largely intact upon electrostatic adsorption on a PSS-terminated PEML surface and accumulate until their further adsorption becomes electrostatically and/or sterically inhibited. The rigid sulfate-bridged PAH aggregates are unable to relax and accommodate adsorption of additional incoming PAH, leading to the formation of void defects observed in FIG. 2. The void formation is exacerbated during the early stages of PEML deposition by the known ability of the substrate roughness and substrate-polyelectrolyte interactions to affect PEML structure and morphology (Soltwedel et al., "Interdiffusion in Polyelectrolyte Multilayers" *Macromolecules* 2010, 43, 7288-7293).

During the salt rinsing steps, excess PAH solution remaining at the film surface is first replaced by a corresponding polyelectrolyte-free mixed $SO_4^{2-}/Cl^-$ salt solution. The following rinse with 1.00 M NaCl (aq) solution exchanges $SO_4^{2-}$ dianions in the adsorbed PAH aggregates for $Cl^-$ anions, concomitantly reducing the hydration of the aggregates, because $SO_4^{2-}$ is a kosmotropic anion that binds water well, and forcing partial deprotonation of the PAH amine sites to maintain electroneutrality (FIG. 3A). As a result, partial collapse (i.e., flattening) of the aggregate occurs, which enhances interactions between the amine sites of its component PAH chains via formation of interchain hydrogen bonds that further stabilize the adsorbed aggregate.

During a subsequent rinse in water, excess NaCl is removed from the surface. PAH chains near the surface of the aggregate respond to the decrease in solution ionic strength by partial uncoiling and extension into the solution, consistently with previous observations and with the two apparent populations of PAH chains observed in the $Ru(BPS)_3^{4-}$ dye experiments described herein. After the aqueous rinsing step, the tightly packed and intertwined chains in the interior of PAH aggregates are covered by more loosely packed and extended (re)protonated exterior chains exhibiting a more open structure. The presence of flexible exterior PAH chains after water rinsing facilitates healing of void defects as film thickness grows (FIG. 2), both directly and indirectly, by promoting adsorption of large amounts of PSS (FIG. 4) to complete the bilayer formation (FIG. 1).

Two important quantitative consequences of the anion-bridging model directly explain the unusual combination of exponential and linear features of the PSS/PAH film formation in the presence of $SO_4^{2-}$ anions. First, higher levels of $SO_4^{2-}$ in the PAH treatment solution will lead to increased aggregation and to deposition of more and larger PAH aggregates (FIG. 4A). The PAH aggregates, in turn, bind PSS in fixed ratios (FIG. 4B), leading to linear rather than exponential film growth at any specific fixed $SO_4^{2-}$ concentration (FIG. 5).

Figure 6:
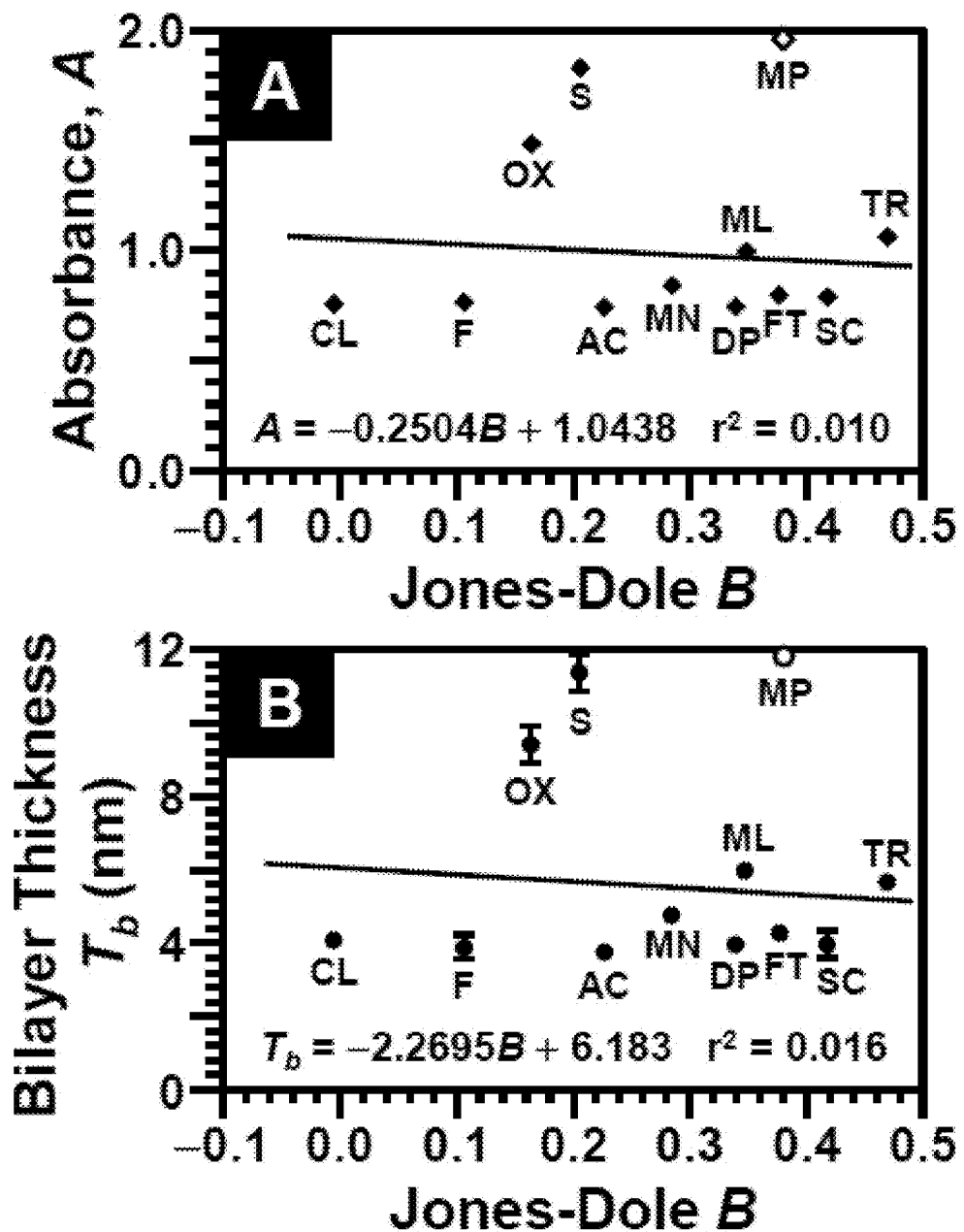
FIG. 6 shows Hofmeister correlations of salt anion Jones-Dole B viscosity parameter with (A) the absorbance at 225 nm, A, for each Q-EDA/(PSS/PAH)$_{20}$ PEML and (B) the PSS/PAH bilayer thickness, $T_b$, for each Si-EDA/(PSS/PAH)$_{24}$ PEML prepared using polyelectrolyte solutions containing each salt shown. Abbreviations for the salt anions are shown in Table 3 and FIG. 7. Salt anions were typically present at 0.05 M levels in the deposition solutions, with the exception of MP (open diamond and circle), which was limited by gel formation to levels of ≈0.011 M. Table 3 lists the data plotted and additional information concerning the films.

The effects of univalent anions on PEMLs are successfully predicted by their ordering in the Hofmeister series (Hofmeister, "Zur Lehre von der Wirkung der Salze—Zweite Mittheilung" *Arch. Exp. Pathol. Pharmakol.* (Leipzig) 1888, 24, 247-260). Accordingly, the Hofmeister effect was considered as an alternative explanation for the results in experiments with multivalent anions (FIG. 6).

PEML properties are strongly influenced by univalent chaotropes and less affected by kosmotropes. The anions examined here are exclusively kosmotropes and include both univalent and divalent species (Table 3, FIG. 7). It was found that neither UV absorbance ($A_{225}$) nor thickness of PEMLs are correlated with Jones-Dole B viscosity coefficients for the anions in this study (FIG. 6, Table 3), indicating that Hofmeister effects are not responsible for the behavior of the PEMLs. Conversely, as predicted by the anion-bridging model, the divalent bridging anions $SO_4^{2-}$, $HPO_4^{2-}$, and $C_2O_4^{2-}$ provide significantly increased film absorbance and thickness compared to those PEMLs produced by the $Cl^-$, $F^-$, $H_2PO_4^-$, and acetate univalent anions.

In summary, the presence of bridging dianions as additives to PSS and PAH polyelectrolyte solutions used for the fabrication of PSS/PAH PEMLs may exert a profound influence on the physicochemical properties of the assembled multilayer films. In contrast to previous observations for univalent anion additives, whereby PSS/PAH film properties were related to anion position in the Hofmeister series, the tandem increases in film absorbance and thickness observed here are correlated to the dianion concentrations and their ability to bridge protonated amine sites of the PAH component of multilayers. Detailed structural analysis of films prepared using divalent sulfate anion as an additive indicates that polyelectrolyte deposition using the protocol proceeds in the linear regime and without inclusion of the dianion, yielding stratified film structures that comprise PSS-decorated PAH aggregates.

The film deposition is well-described by a general model in which electrostatic bridging of protonated amine sites on the PAH chains by the dianions occurs in solution, leading to the formation of PAH aggregates that are adsorbed intact onto each terminal PSS layer in the growing film. This behavior contrasts with analogous PAH aggregates present in solutions containing univalent anions, such as chloride, where PAH aggregates are apparently more loosely organized and insufficiently stable to maintain their structure upon adsorption to the surface. As a result, films deposited from solutions containing bridging dianions experience packing inefficiencies, which lead to formation of void defects that are partially healed as additional polyelectrolyte layers are deposited. The repeated formation and healing of void defects creates a uniquely structured internally porous architecture. Therefore, the ability to control PAH aggregate size and concentration in the deposition solution by altering the nature and concentration of dianion present suggests the possibility for tuning internal structure to create films exhibiting controlled porous structures useful for diverse applications ranging from encapsulation and filtration to nanoscale reaction vessels.

In the method disclosed herein, a substrate is provided, which may be any substrate on which a PEML may be deposited. Suitable substrates include, but are not limited to, a silicon or quartz substrate, which may have a self-assembled monolayer (SAM) of a chemisorbed organosiloxane, aminosiloxane, or alkylamine siloxane such as N-(2-aminoethyl)-3-aminopropyltrimethoxysilane (EDA), N-(2-aminoethyl)-3-aminobutyltrimethoxysilane, or N-(2-aminoethyl)-3-aminoalkyltrimethoxysilane thereon, providing initial cationic sites in aqueous solution (of pH less than approximately 9-10) for polyelectrolyte adsorption. It is also possible to use a bare Si or quartz substrate, which each have silanol sites that are deprotonated above pH of approximately 5.

Next, a first solution of a first polyelectrolyte polymer is deposited on the substrate to form a layer of the first polyelectrolyte. The first polyelectrolyte may be either anionic or cationic, depending on the charge of the substrate surface, and the solution may contain more than one such polymer. For example, an anionic polyelectrolyte solution would be used to treat a substrate bearing an EDA SAM, whereas a cationic polyelectrolyte solution would be used to treat a substrate having a negative surface charge, such as a clean quartz substrate at pH of approximately 7. Then a second solution of second polyelectrolyte is deposited on the layer of the first polyelectrolyte to form a layer of the second polyelectrolyte. The second polyelectrolyte is a polyanion or polycation polymer of the opposite charge as the first polyelectrolyte, and the solution may contain more than one such polymer. Suitable polyelectrolytes include, but are not limited to, polyallylamine hydrochloride (PAH), polydiallyldimethylammonium chloride (PDDA), and protonated polyvinylpyridines that may be in acidic solution (i.e., pH less than approximately 5), polyvinylpyridinium and copolymers thereof salts as cationic polyelectrolytes. Sodium polyacrylate, sodium polymethacrylate, sodium polyvinylsulfate, sodium polyvinylsulfonate, and sodium polystyrene sulfonate (PSS), and copolymers thereof constitute representative anionic polyelectrolytes. Depositing the polyelectrolyte layers may be repeated to form thicker PEMLs by depositing onto the layer of the second polyelectrolyte one or more alternating layers of the first polyelectrolyte using the first solution and the second polyelectrolyte using the second solution. In the case of a bare Si or quartz substrate, it may be coated first with the PAH aggregate polyelectrolyte solution and then the PSS and repeat to build the film.

At least one of the solutions, which may be the first solution or the second solution and may be anionic or cationic, is an aggregate-forming solution comprising one or more ionic species having at least two discrete sites of charge opposite to that of the polyelectrolyte polymer in the aggregate-forming solution. As described herein the ionic species forms via bridging interactions aggregates of the polyelectrolyte in the aggregate-forming solution that remain intact in the aggregate-forming solution and at least partially intact during the contact and layer formation, during the deposition. "At least partially intact" can mean that at least one or at least 50% of the bridging interactions remains intact. This process can form a multilayer structure having internal pores and comprised of layers of stacked polycation (polyanion) aggregates separated and held together by layers of polyanion (polycation). Suitable ionic species include, but are not limited to, an anion having two or more discrete negatively-charged sites at an obtuse angle, $SO_4^{-2}$, $HPO_4^{-2}$, and an organic dicarboxylate (FIG. 7). Other dianions without an obtuse angle between the two specific anion sites and/or for which the two anionic sites are not rigidly connected may also be suitable (e.g., malonate or succinate), however, they may not necessarily perform as well as $SO_4^{-2}$. Additional materials that may be included in the PEML include, but are not limited to, $Na_4Ru(BPS)_3$ deposited on a layer of polyallylamine hydrochloride.

The PEML may be further processed by rinsing the layer formed from the aggregate-forming solution as described herein with 1) a polyelectrolyte-free solution comprising the same diionic species as the aggregate-forming solution and may have the same salt composition thereof, 2) a salt solution having an ionic strength the same as or within 10% of that of the deposition solutions (such as 1.0 M), and 3) water. The water may be at least 90% or 99% pure or a degree of purity considered in the art to be salt-free. Salt-free may also mean that the ionic strength of the water is less that than dissolving just the polyelectrolytes in water in previous steps. Alternatively the layer formed from the aggregate-forming solution may be rinsed with water one, two, three, or more times. If the triple rinse is done in water, extra PAH from the aggregate solution may precipitate directly onto the film surface, which may significantly increase roughness and heterogeneity and affect the porosity.

The following examples are given to illustrate specific applications. These specific examples are not intended to limit the scope of the disclosure in this application.

Example 1

Materials

Deionized water (18 MΩ-cm) for all experiments was obtained from an Elix® 5 Milli-Q Plus Ultra-Pure Water System (Millipore Corp.). All organic solvents were ACS reagent Grade or better used as received from Sigma-Aldrich. Nitrogen gas was obtained from liquid $N_2$ boil-off via plumbed in-house lines and passed through a cellulose filter prior to use.

The following materials were used as received from the indicated commercial source, unless noted otherwise. Poly-allylamine hydrochloride (PAH, $M_w$=70,000 g·mole$^{-1}$, No. 28322-3), sodium polystyrenesulfonate (PSS, $M_w$=70,000 g·mole$^{-1}$, No. 24305-1), sodium chloride (NaCl, 99.5%, No. S7653), sodium dihydrogen phosphate ($NaH_2PO_4$, >99.0%, No. S8282), sodium fluoride (NaF, 99+%, No. 20, 115-4), glacial acetic acid (HOAc, 99.99+%, No. 338826), sodium acetate ($NaC_2H_3O_2$, >99.0%, No. S8750), disodium hydrogen phosphate ($Na_2HPO_4$, >98%, anhydrous, No. S-7907), sodium oxalate ($Na_2C_2O_4$, ≥99.99%, No. 379735), disodium fumarate ($Na_2C_4H_2N_2O_4$, >99%, No. F1506), sodium sulfate ($Na_2SO_4$, 99%, No. 23, 391-3), magnesium chloride ($MgCl_2 \cdot 6H_2O$, >99.0%, No. M0250), ruthenium trichloride hydrate ($RuCl_3 \cdot H_2O$, >98%, No. 206229), disodium bathophenanthrolinesulfonate (BPS, 98%, $Na_2C_{24}H_{14}N_2S_2O_6 \cdot 3H_2O$, No. 14661-7), and 2,2'-bipyridine (bpy, $C_{10}H_8N_2$, 99+%, No. D21630-5) were all from Sigma-Aldrich Chemicals. Magnesium sulfate ($MgSO_4$, ≥98.0%, No. BDH0246) was from BCH Chemicals Inc. and L-(+)-sodium tartrate ($Na_2C_4H_4O_6 \cdot 2H_2O$, >99.0%, No. BP352) was from Fisher Scientific. Disodium malonate ($Na_2C_3H_2O_4$, 99%, No. M0031), disodium succinate ($Na_2C_4H_4O_4 \cdot 6H_2O$, >98.0%, S0105), and disodium maleate ($Na_2C_4H_2N_2O_4$, >99.0%, No. M0014) were from TCI America Inc. N-(2-aminoethyl)-3-aminopropyltrimethoxysilane (EDA, >95%, No. SIA0591.0) from Gelest Inc. was purified by vacuum distillation (140-142° C.; 14-15 mm Hg) immediately prior to use.

$Ru(bpy)_3(ClO_4)_2$ was initially prepared as the chloride salt by refluxing stoichiometric amounts of $RuCl_3$ and bpy ligand in 1:1 v/v ethanol:water under $N_2$ atmosphere for ca. 4 h. The crude product was isolated by evaporation of the solvent, dissolved in a minimum amount of water, and purified by ion exchange chromatography using a literature method (Huang et al., "Luminescent α-Diimine Complexes of Ruthenium(II) Containing Scorpionate Ligands" *Inorg. Chim. Acta* 2000, 310, 227-236), followed by metathesis to the $ClO_4^-$ salt prior to use. $Na_4Ru(BPS)_3$ was prepared from $RuCl_3$ and BPS by the literature method (Zanarini et al., "Electrochemistry and Electrochemiluminescence of [Ru(II)-tris(bathophenanthroline-disulfonate)]$^{4-}$ in Aprotic Conditions and Aqueous Buffers" *J. Phys. Chem. B* 2008, 112, 10188-10193).

Polished quartz slides (No. 20200, 25.4 mm×50.8 mm×1 mm) were from Quartz Scientific Inc. Silicon wafers (100 mm diameter, 500-550 μm thickness, [100] orientation, p-type (B doping), resistivity 6-9Ω, No. PD7403) from Wacker Siltronic Corp. were cut into 25×50 mm$^2$ pieces for use in the experiments.

Example 2

Polyelectrolyte Solutions

The deposition solutions were prepared by addition of concentrated aqueous salt mixtures to a well-stirred solution of PAH (or PSS) in water. Each salt mixture contained NaCl and the ion to be studied at concentrations that produced 0.01-0.05 M of the studied ion and μ=1.00 M ionic strength after mixing with the PAH (or PSS) solution (Table 1). The concentrations of PAH and PSS after mixing were each 2 mg/mL. Before mixing, levels of the ion to be studied were typically ca. 0.070-0.075 M, limited for some of the dianions by solubility or irreversible gelation upon mixing with PAH. Even at these ion concentrations, gels were irreversibly formed if PAH solution was added to some salt mixtures. Adding the salt mixture to a stirred PAH solution sometimes initially generated a white precipitate, which quickly dissolved, however, to form a clear stable solution. In contrast, no gelation was observed for PSS solutions.

TABLE 1

Salt Solution Compositions and pH Values

| | | Solution pH$^c$ | | |
|---|---|---|---|---|
| Salt Identity$^a$ | Solution Composition$^b$ | Rinse$^d$ | PSS$^e$ | PAH$^f$ |
| NaCl | 1.00M NaCl | 6.50$^g$ | 6.47 | 4.58 |
| NaF | 0.05M NaF/0.95M NaCl | 7.35$^h$ | 7.46$^h$ | 5.75 |
| $NaH_2PO_4$ | 0.05M $NaH_2PO_4$/0.95M NaCl | 4.18 | 4.20 | 4.03 |
| Na(Acetate) | 0.05M $H_3$CCOONa/0.95M NaCl | 7.11 | 6.97 | 6.50 |
| $MgCl_2$ | 0.05M $MgCl_2$/0.85M NaCl | 6.77 | 6.46 | 5.14 |
| $MgSO_4$ | 0.05M $MgSO_4$/0.80M NaCl | 6.52 | 6.40 | 5.09 |
| $Na_2SO_4$ | 0.05M $Na_2SO_4$/0.85M NaCl | 6.97 | 6.91 | 6.05 |
| $Na_2HPO_4$ | 0.011M $Na_2HPO_4$/0.010M $NaH_2PO_4$/0.967M NaCl | 6.25 | 6.25 | 6.15 |
| $Na_2$Oxalate | 0.05M $Na_2C_2O_4$/0.85M NaCl | 7.57$^h$ | 7.39$^h$ | 6.40 |
| $Na_2$Tartrate | 0.05M NaOOCCH(OH)CH(OH)COONa/0.85M NaCl | 6.68 | 6.67 | 6.05 |
| $Na_2$Maleate | 0.05M cis-NaOOCCH=CHCOONa/0.85M NaCl | 8.12$^h$ | 7.69$^h$ | 7.19 |
| $Na_2$Fumarate | 0.05M trans-NaOOCCH=CHCOONa/0.85M NaCl | 7.00 | 6.72 | 6.07 |

TABLE 1-continued

Salt Solution Compositions and pH Values

| | | Solution pH[c] | | |
|---|---|---|---|---|
| Salt Identity[a] | Solution Composition[b] | Rinse[d] | PSS[e] | PAH[f] |
| Na$_2$Malonate | 0.05M NaOOCCH$_2$COONa/0.85M NaCl | 7.42 | 7.28 | 6.86 |
| Na$_2$Succinate | 0.05M NaOOC(CH$_2$)$_2$COONa/0.85M NaCl | 7.17 | 7.28 | 6.85 |

[a]Identity of the unique salt present in each polyelectrolyte solution during the deposition of the multilayer films.
[b]Composition of the salt solution showing the concentrations of the unique salt tested and added NaCl to adjust total solution ionic strength $\mu$ = 1.00M.
[c]pH of freshly prepared solution measured at 23 ± 2° C. Std. dev. = 0.03 pH units (from 3 measurements).
[d]pH of the first multilayer film rinse solution having the composition shown in column 2 and used in the salt rinse protocol.
[e]pH of the solution shown in column 2 also containing 2 mg PSS polyelectrolyte/mL solution and used for multilayer deposition.
[f]pH of the solution shown in column 2 also containing 2 mg PAH polyelectrolyte/mL solution and used for multilayer deposition.
[g]1.00M NaCl (aq) solution having this pH is also used as the second rinse solution in the salt rinse protocol.
[h]Solution pH dropped ca. 0.1-0.3 units after repeated solution exposure to the air during normal use due to slow adsorption of carbon dioxide.

The presence of $SO_4^{2-}$ and related dianions in solution during deposition of multilayers containing PAH greatly limits the available process window for film fabrication. For example, the dianion concentration must be kept below its gelation threshold value to provide stable polyelectrolyte solutions required for reproducible film deposition. In particular, for preparation of the $\mu$=1.00 M PAH solutions with the various salts used in this work, it was found that gel formation is inhibited by addition of a concentrated salt solution containing NaCl and a salt of the dianion to be studied to a well-stirred solution of PAH in water. Concentrations of components are chosen with regard to solubility considerations and gelation threshold, as described in this work and the available literature. The procedure produces stable solutions having appropriate levels of the dianion, NaCl, and PAH for PEML fabrication (Table 1). In contrast, addition of the PAH solution to the concentrated salt solution leads to immediate or eventual (within ca. 1-2 days) gelation for several dianions studied.

The following example describes a typical preparation of a polyelectrolyte solution for fabrication of PEMLs. To prepare the PAH deposition solution containing 2 mg PAH/mL 0.05 M Na$_2$SO$_4$/0.85 M NaCl, 350 mL of a solution containing 0.071 M Na$_2$SO$_4$ and 1.210 M NaCl was slowly added with stirring to an aqueous solution prepared by dissolving 1.00 g PAH in 150 mL water. Although some white cloudiness was observed during the initial stages of the addition, the solution became clear as the addition progressed. The solution was stirred for an additional 30 min and stored sealed in a Pyrex bottle for 2 days prior to use. Other solutions listed in Table 1 were prepared in a similar manner.

Finally, because PAH contains primary alkylamine groups, solution pH must also be controlled to ensure that the degree of amine protonation remains approximately constant during the PEML deposition process regardless of which salt is present in solution. Kobayashi et al. ("Poly(allylamine)-Chelating Properties and Resins for Uranium Recovery from Seawater" Macromolecules 1985, 18, 2357-2361) have measured a $pK_a^{\mu=1} \cong 9.67$ for PAH in $\mu$=1.00 M KCl (aq) solution and confirmed that it acts as a monobasic species. This value is ca. 0.9-1.0 pK unit lower than that expected for an aliphatic primary amine in aqueous solution ($\mu \rightarrow 0$), consistent with independent measurements of the general effect of $\mu$ on $pK_a$ values in the solutions. Therefore, to maintain complete (i.e., >99%) protonation of the alkylamine sites of PAH in solution during PEML deposition, the PSS and PAH solutions must have pH≤7.67. This requirement is met for all experiments (note Table 1), ensuring consistent protonation of the PAH during multilayer fabrication regardless of the nature of the salt present.

Example 3

Substrate Preparation

Silicon wafer and quartz substrates were cleaned with 1:1 v/v HCl/CH$_3$OH and H$_2$SO$_4$, as described in Dressick et al., "Proximity X-ray Lithography of Siloxane and Polymer Films Containing Benzyl Chloride Functional Groups" J. Vac. Sci. Technol., A 1999, 17, 1432-1440. Thereafter, a self-assembled monolayer (SAM) of N-(2-aminoethyl)-3-aminopropyltrimethoxysilane (EDA) was immediately formed on each substrate as described in Chen et al. "Channel-constrained Electroless Metal Deposition on Ligating Self-Assembled Film Surfaces" J. Electrochem. Soc. 1999, 146, 1421-1430. The EDA-coated Si wafers (Si-EDA) and quartz (Q-EDA) were stored in Fluoroware containers and were sufficiently stable and clean for PEML deposition experiments for at least 6 months after preparation.

Example 4

Polyelectrolyte Deposition

The PSS/PAH multilayer films were prepared on the lab bench under ambient conditions by dipcoating substrates in the PAH and PSS polyelectrolyte solutions containing the appropriate salts (FIG. 7). For each PEML film, Q-EDA and Si-EDA substrates were initially treated with the PSS solution for at least 20 min in a Coplin jar. The treated substrates were then subjected to a "salt rinse" protocol involving initial rinsing for 30-60 s in a solution having the same salt composition as the deposition solution, followed by a 30-60 s rinse in 1.00 M NaCl (aq), a final ca. 3 min rinse in water, and drying in a N$_2$ gas stream. The samples were then treated 20 min in the PAH solution, followed by the same rinsing and drying as after the PSS deposition. Alternate treatments with the PSS and PAH continued until films of 20 PSS/PAH bilayers on Q-EDA (i.e., Q-EDA/(PSS/PAH)$_{20}$) or up to 24 PSS/PAH bilayers on Si-EDA (i.e., Si-EDA/(PSS/PAH)$_{24}$) had been deposited. To maintain >99% protonation of PAH amines ($pK_a^{\mu=1M}$=9.67) during PEML depositions, pH≤7.67 (Table 1) was ensured for all the PSS and PAH solutions. In some cases, the salt rinse was replaced by a "water rinse" protocol whereby the substrates were triple-rinsed in H$_2$O, rather than in salt solutions, after deposition of each polyelectrolyte layer (Table 2).

TABLE 2

Properties of Multilayer Films Deposited from Salt Solutions
(Triple Water Rinse Protocol)

| salt[a] (substrate)[b] | absorbance[c] | thickness (nm) total film[d] | thickness (nm) bilayer[e] | roughness (nm) $r_q^f$ | roughness (nm) N[g] |
|---|---|---|---|---|---|
| NaCl[h] (Q) | 0.7588 | — | — | — | — |
| NaCl[h] (Si) | — | 97.5 ± 2.2 | 4.1 ± 0.1 | 0.83 ± 0.37 | 3 |
| NaH$_2$PO$_4^h$ (Q) | 0.7696 | 80.4 ± 1.6 | 4.0 ± 0.1 | 0.95 ± 0.12 | 5 |
| NaH$_2$PO$_4^h$ (Si) | — | 100.5 ± 0.7 | 4.2 ± 0.3 | 0.84 ± 0.09 | 3 |
| MgCl$_2^i$ (Q) | 0.7466 | 77.4 ± 7.2 | 3.9 ± 0.4 | 1.27 ± 0.16 | 3 |
| MgCl$_2^i$ (Si) | — | 93.5 ± 4.0 | 3.9 ± 0.1 | 0.99 ± 0.50 | 4 |
| NaSO$_4^i$ (Q) | 2.8157 | 347.6 ± 12.5 | 17.4 ± 0.6 | 15.90 ± 4.80 | 3 |
| NaSO$_4^i$ (Si) | — | 411.6 ± 13.6 | 17.1 ± 0.4 | — | — |
| MgSO$_4^j$ (Q) | 2.6300 | 382.0 ± 50.0 | 19.1 ± 2.5 | 35.55 ± 5.88 | 4 |
| Na$_2$HPO$_4^k$ (Si) | — | 304.9 ± 5.5 | 12.7 ± 0.2 | 2.91 ± 0.68 | 3 |

[a]Identity of the univalent or divalent ion salt present in each polyelectrolyte solution during multilayer deposition. Each salt was present at 0.05M concentration, except where noted, with sufficient NaCl added to fix the solution ionic strength at μ = 1.00M.
[b]Identity of the substrate coated with the multilayer. Q = quartz and Si = silicon wafer. Substrates were coated with a chemisorbed EDA organosiloxane monolayer prior to multilayer deposition. Multilayer films have structure: Substrate-EDA/(PSS/PAH)$_x$ (x = 20 for quartz (Q) and x = 24 for silicon (Si) substrates). Films were triple-rinsed with water and dried in the filtered N$_2$ gas stream after deposition of each PSS and PAH layer.
[c]UV absorbance of the multilayer film at 225 nm on a quartz substrate.
[d]Thickness (±std. dev.) of the multilayer film as determined by AFM.
[e]Average thickness (±std. dev.) of a single PSS/PAH bilayer within the multilayer film, calculated by division of the total film thickness by the number of bilayers deposited, x, with x = 20 (quartz) or x = 24 (Si).
[f]Root-mean-square roughness, r$_q$, (±std. dev.) from AFM measurements.
[g]Number of measurements taken to determine roughness values.
[h]Contains 0.95M NaCl added to adjust ionic strength.
[i]Contains 0.85M NaCl added to adjust ionic strength.
[j]Contains 0.80M NaCl added to adjust ionic strength.
[k]PAH solubility issues limit the Na$_2$HPO$_4$ concentration to 0.011M, with 0.957M NaCl and with 0.010M NaH$_2$PO$_4$ added for ionic strength and pH buffer control.

For PEMLs containing the Na$_4$Ru(BPS)$_3$ complex of structure shown in FIG. 7, trilayer structures of PSS/PAH/Ru (where Ru≡Ru(BPS)$_3^{4-}$) were present in the films. Each Ru layer was deposited onto a PAH layer using an aqueous solution containing 2 mg Na$_4$Ru(BPS)$_3$ complex/mL water. Following a 30 min treatment, the sample was rinsed three times in water and dried using the filtered N$_2$ gas stream. However, each PSS and PAH layer in the PSS/PAH/Ru trilayer multilayer was rinsed using the standard salt rinse protocol with 0.04 M Na$_2$SO$_4$/0.88 M NaCl (aq) solution, then 1.00 M NaCl (aq) solution, and finally water. Because deposition of PSS displaced some adsorbed Ru(BPS)$_3^{4-}$ from the film surface, fresh PSS solution was used for deposition of each PSS layer. For all PEML depositions, the pH values of the PAH, PSS, and initial salt rinse solutions were measured (Table 1) immediately after solution preparation with a Corning Pinnacle 530 pH meter. All multilayer-coated substrates were stored in Fluoroware containers until needed for further study.

HPO$_4^{2-}$ dianion was used to provide a comparison with the results for SO$_4^{2-}$ because both these anions possess two angled anionic sites (P—O$^-$ and S—O$^-$, respectively, see FIG. 7) capable of interacting with PAH amine sites at the solution pH used during film deposition (note Table 1). The solution concentration of HPO$_4^{2-}$ used in the experiments is limited to a maximum level of ca. 0.011 M, with higher concentrations rapidly inducing gel formation. Nevertheless, PEMLs fabricated from solutions containing ca. 0.011 M HPO$_4^{2-}$ dianion exhibit the largest absorbance and thickness values among the anions in Table 5.

To develop a better understanding of the PEML deposition in presence of phosphate, its ionization was examined under the experimental conditions. For the reaction:

$$H_2PO_4^- \leftrightarrow H^+ + HPO_4^{2-} \quad (1a)$$

$$pK_a = pH + \log [HPO_4^{2-}]/[H_2PO_4^-] \quad (1b)$$

If [HPO$_4^{2-}$]=[H$_2$PO$_4^-$], the logarithm term vanishes and pK$_a$=pH. Therefore, a μ=1.00 M solution containing 0.958 M NaCl, 0.011 M NaH$_2$PO$_4$, and 0.011 M Na$_2$HPO$_4$ was prepared, and its pH=pK$_a$=6.29±0.03 measured. This value is ca. 0.9 pK units lower than the pK$_a$=7.21±0.01 measured in water for the same reaction (*CRC Handbook of Chemistry and Physics*, 79th Ed.; Lide, D. R., Ed.; CRC Press: New York, 1999; p. 8-45).

Given the solution pH of the experiments (cf., Tables 1 and 3), the third P—OH site of HPO$_4^{2-}$ will exist in the non-ionized P—OH form in solution in the absence of PAH. The superior performance of HPO$_4^{2-}$ in PEML deposition experiments may be a consequence of the potential deprotonation of that third P—OH site. Electrostatic binding of the two P—O$^-$ sites to protonated amines on the polyelectrolyte chain in PAH solution will alter the local environment of the remaining P—OH site. Spontaneous deprotonation of the remaining P—OH site would permit formation of an additional electrostatic interaction with an adjacent PAH protonated amine, further stabilizing the (PAH—NH$_3^+$)$_2$ . . . HPO$_4^{2-}$ interface as shown in Eq. (2):

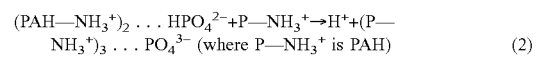

$$(PAH-NH_3^+)_2 \ldots HPO_4^{2-} + P-NH_3^+ \rightarrow H^+ + (P-NH_3^+)_3 \ldots PO_4^{3-} \text{ (where } P-NH_3^+ \text{ is PAH)} \quad (2)$$

The extreme pH sensitivity of the HPO$_4^{2-}$ bridging phenomenon, which is quenched via addition of a proton to form H$_2$PO$_4^-$, is consistent with the mechanism described above.

TABLE 3

Correlation of Film Absorbance and Thickness with Ion Jones-Dole B Parameters

| Ion Name (Formula)[a] | ID[b] | $pK_a$[c] | B[d] | A(225 nm)[e] | Bilayer Thickness (Std. Dev.)[f] |
|---|---|---|---|---|---|
| Chloride (Cl$^-$) | CL | — | −0.005[g] | 0.7558 | 4.1 (0.1) |
| Fluoride (F$^-$) | F | — | 0.107[g] | 0.7620 | 3.9 (0.34) |
| Oxalate ($C_2O_4^{2-}$) | OX | 4.19 | 0.164[h] | 1.4746 | 9.4 (0.5) |
| Sulfate ($SO_4^{2-}$) | S | — | 0.206[g] | 1.8176 | 11.4 (0.5) |
| Acetate ($CH_3COO^-$) | AC | 4.76 | 0.227[h] | 0.7412 | 3.78 (0.07) |
| Malonate $CH_2(COO^-)_2$ | MN | 4.69 | 0.285[h] | 0.8335 | 4.8 (0.1) |
| Dihydrogenphosphate ($H_2PO_4^-$) | DP | 7.21 | 0.340[g] | 0.7434 | 4.00 (0.04) |
| Maleate (cis-$^-$OOCCH=CHCOO$^-$) | ML | 6.07 | 0.348[h] | 0.9829 | 6.0 (0.1) |
| Fumarate (trans-$^-$OOCCH=CHCOO$^-$) | FT | 4.44 | 0.377[h] | 0.7970 | 4.3 (0.1) |
| Monohydrogenphosphate ($HPO_4^{2-}$)[i] | MP | 12.32 | 0.382[g] | 1.9078 | 12.0 (0.2) |
| Succinate ($^-$OOCCH$_2$CH$_2$COO$^-$) | SC | 5.61 | 0.418[h] | 0.7826 | 4.0 (0.4) |
| Tartrate ($^-$OOCCH(OH)CH(OH)COO$^-$) | TR | 4.34 | 0.469[h] | 1.0557 | 5.67 (0.09) |

[a]Ion concentrations are 0.05M as Na$^+$ salts, except where noted, with sufficient added NaCl to give a μ = 1.00M ionic strength in solution.
[b]Abbreviation used to identify ions in FIG. 6.
[c]$pK_a$ (25° C., μ→0) for the reaction HB$^-$ ⇌ H$^+$ + B$^{2-}$ (OX, MN, ML, FT, SC, and TR), for the reaction HB ⇌ H$^+$ + B$^-$ (AC), for the reaction H$_2$B$^-$ ⇌ H$^+$ + HB$^{2-}$ (DP), and for the reaction HB$^{2-}$ ⇌ H$^+$ + B$^{3-}$ (MP). Values are taken from: CRC Handbook of Chemistry and Physics, 79th Ed.; Lide, D. R., Ed.; CRC Press: New York, 1999; pp. 8-43-8-46. Estimates for corresponding pKa values in the μ = 1.00M solutions are obtained by subtraction of ~0.9 from each value.
[d]Jones-Dole viscosity B coefficient in water at 25° C. from the indicated reference.
[e]Absorbance at 225 nm for a quartz slide coated on both sides with a film of structure Q-EDA/(PSS/PAH)$_{20}$.
[f]Thickness (and standard deviation) in nm of a PSS/PAH bilayer calculated from AFM measurement of the total thickness of a film deposited on Si wafer having structure Q-EDA/(PSS/PAH)$_{24}$.
[g]B value taken from Jenkins et al., "Viscosity B-Coefficients of Ions in Solution" *Chem. Rev.* 1995, 95, 2695-2724.
[h]B value taken from Chmielewska et al., "Viscosimetric Studies of Aqueous Solutions of Salts of Carboxylic Acids" *J. Mol. Liq.* 2005, 122, 110-115.
[i]The HPO$_4^{2-}$ ion is present at 0.011M in a solution also containing 0.010M H$_2$PO$_4^-$ and 0.967M NaCl at pH ~6.25 (PSS and rinse solutions) or pH = 6.15 (PAH solution).

Example 5

Analytical Methods

The XPS characterizations of the PEMLs on Si-EDA substrates were performed using the instrument and procedures described in Bassim et al., "Layer-by-layer Assembly of Heterogeneous Modular Nanocomposites" *J. Phys. Chem. C* 2012, 116, 1694-1701. FTIR spectra were acquired on a Nicolet FTIR spectrometer coupled to a single-bounce attenuated total reflectance (ATR) accessory (Specac Silvergate) with a 45° Ge prism and 7 mm sample window. Spectra were collected using a MCT detector as 256 scans over the 400-000 cm$^{-1}$ wavelength region with 4 cm$^{-1}$ resolution. UV-vis spectra of quartz slides bearing PEML films were acquired using a Cary 5000 UV-vis-NIR double-beam spectrophotometer equipped with Cary WinUV software. A baseline obtained from blank EDA-coated quartz slides was used to correct the UV-vis spectra. Components of the PEMLs produce distinct UV-vis absorbance features: PAH does not absorb above ca. 200 nm, whereas PSS exhibits an absorbance maximum at 225 nm and absorbs strongly below ca. 260 nm. The relative concentrations of available amine and sulfonate sites on terminal PSS and PAH layers were estimated from UV-vis spectra by using, respectively, the Ru(bpy)$_3$(ClO$_4$)$_2$ and Na$_4$Ru(BPS)$_3$ complexes (FIG. 7) as labels. Although these Ru complexes absorb light at wavelengths <260 nm, they possess unique π-π* and dπ-π* transitions near 280-290 nm and ca. 460 nm, respectively, that permit their identification and differentiation from PSS and PAH.

A NanoSight LM10-HSBF nanoparticle size determination system (Nanosight Inc., Worthington, Ohio, USA) was used for detection and analysis of polyelectrolyte aggregates in 0.04 M Na$_2$SO$_4$/0.88 M NaCl and 1.00 M NaCl solutions. The Brownian motion the solutions was tracked and analyzed using the software supplied with the instrument to estimate the hydrodynamic radii and concentrations of any particles present. Because the Nanosight NTA2.1 software was designed to determine the size of hard shell spherical particles, the system cannot provide absolute values for particle size for the polyelectrolyte aggregates having fluxional surface boundaries and shapes. Nevertheless, relative comparisons of the derived parameters for the various polyelectrolytes and solution conditions examined can still be made to provide qualitative information concerning the nature of any aggregates present for samples examined under identical acquisition conditions.

Specifically, the instrument sample solution platen was first rinsed with a salt solution having the same composition as the polyelectrolyte solution to be analyzed and wiped dry with a KimWipe™ lint-free paper towel. The polyelectrolyte solution containing 2 mg/mL of PAH or PSS in either 0.04 M Na$_2$SO$_4$/0.88 M NaCl or 1.00 M NaCl solution was then applied to the platen and particle Brownian motion was recorded at room temperature for 60 s to obtain a video for analysis. Relative brightness (i.e., 0), gain (i.e., 1.00), and blur size (i.e., 5 pixel×5 pixel) settings were the same for all samples and the detection threshold was automatically adjusted by the software. Each experiment was repeated 4-8 times to obtain average values and standard deviations for the particle mean diameter, $D_{50}$ (i.e., particle median) value, and particle concentration. After removal of the sample solution, the platen was rinsed twice with salt solution having the same composition as the polyelectrolyte solution just analyzed. It was then rinsed successively with water, 70:30 v/v ethanol:water, and water again before being dried with a lint-free paper towel to complete the cleaning process before measurement of the next sample. Control experiments were performed using polyelectrolyte-free 1.00 M NaCl and 0.04 M Na$_2$SO$_4$/0.88 M NaCl solutions. Because the results for these controls indicated that the polyelectrolyte-free salt solutions contained essentially no particles (i.e., >100-fold less than analogous solutions containing the polyelectrolytes), no corrections were made to the data obtained for the polyelectrolyte solutions.

Cross-sectional PEML samples for transmission electron microscopy (TEM) were prepared according to the literature procedure (Bassim et al., "Layer-by-layer Assembly of Heterogeneous Modular Nanocomposites" *J. Phys. Chem. C* 2012, 116, 1694-1701; Bassim et al. "Minimizing Damage during FIB Sample Preparation of Soft Materials" *J. Microsc.* 2012, 245, 288-301) using an FEI Nova Nanolab Focused Ion Beam (FIB) tool operated at 30 kV Ga$^+$. The top surface of each PEML was coated with evaporated carbon to minimize ion and electron beam damage during cross-section preparation. The cross-sectional samples were aligned using the [001] direction of the Si substrate and analyzed in scanning transmission electron microscopy high-angle annular darkfield (STEM-HAADF) mode with a 0.5 nm spot size in a JEOL 2200FS microscope operated at 200 keV. The STEM-HAADF image intensity depends on atomic number, $\sim Z^{1.6}$, so the contrast in PEMLs was increased by introducing a high-Z stain (Ru(BPS)$_3$$^{4-}$ dye complex) in one of the polyelectrolyte layers, as described above. Roughness and layer continuity were evaluated by integrated measurements of pixel intensity perpendicular to the layers.

To assess sample surface topography, roughness, and film thickness, AFM experiments were performed in air on a Veeco Nanoman AFM in tapping mode (intermittent contact mode) using TESP tips with 20 nm nominal radii. AFM measurements were made in air to assess sample surface topography, surface roughness, and film thickness. At least 3 images per sample were acquired from regions away from film edges for evaluations of surface topography and roughness. Images for topography evaluation were typically acquired at 10×10 µm$^2$ scan sizes, with occasional additional measurements made as necessary at 20×20 µm$^2$, 5×5 µm$^2$, and 2×2 µm$^2$ scan sizes. Roughness measurements were made in a 25 µm$^2$ region (typically 5×5 µm$^2$) after processing the image using a flattening routine in the instrument software.

Samples were prepared for AFM measurement of total PEML film thickness by gently scribing PEMLs deposited onto the Si-EDA (or Q-EDA) substrate with stainless steel micro-scope tweezers to create a step edge boundary for the measurement. The scribing was not found to damage the substrate surface. To determine whether any PSS/PAH layers were left after scribing, representative samples were more aggressively scribed using tweezers or a razor blade. AFM measurements indicated removal of a small additional amount of material (ca. 1 nm) consistent with loss of the EDA monolayer from these surfaces, which was observed as a brighter region by optical microscopy (the EDA appearing darker than the native silicon under a microscope objective). While this observation does not prove that there are no PEMLs remaining on the substrate, it is likely that the scribing provides a reasonable and consistent method to assess multilayer thickness.

In some cases the thickness increase noted following deposition of a PAH layer to a PSS-terminated PEML was also measured. Samples for this measurement were prepared by dipping only a portion of the substrate bearing the PSS-terminated PEML into the PAH treatment solution, thereby creating a PSS-PAH step edge boundary to facilitate the measurement. For both the incremental PAH thickness increase and total PEML film thickness, measurements were made by scanning the AFM tip across each step edge boundary at a right angle. A minimum of 18 such measurements were made for each thickness determination, with the average thickness reported. The error for the total film thickness is reported as the standard deviation of the data. The errors reported for the PSS/PAH bilayer thickness and the PAH layer thickness are calculated using the propagation of errors method (chain rule calculus).

Example 6

PAH Aggregation

Figure 8:
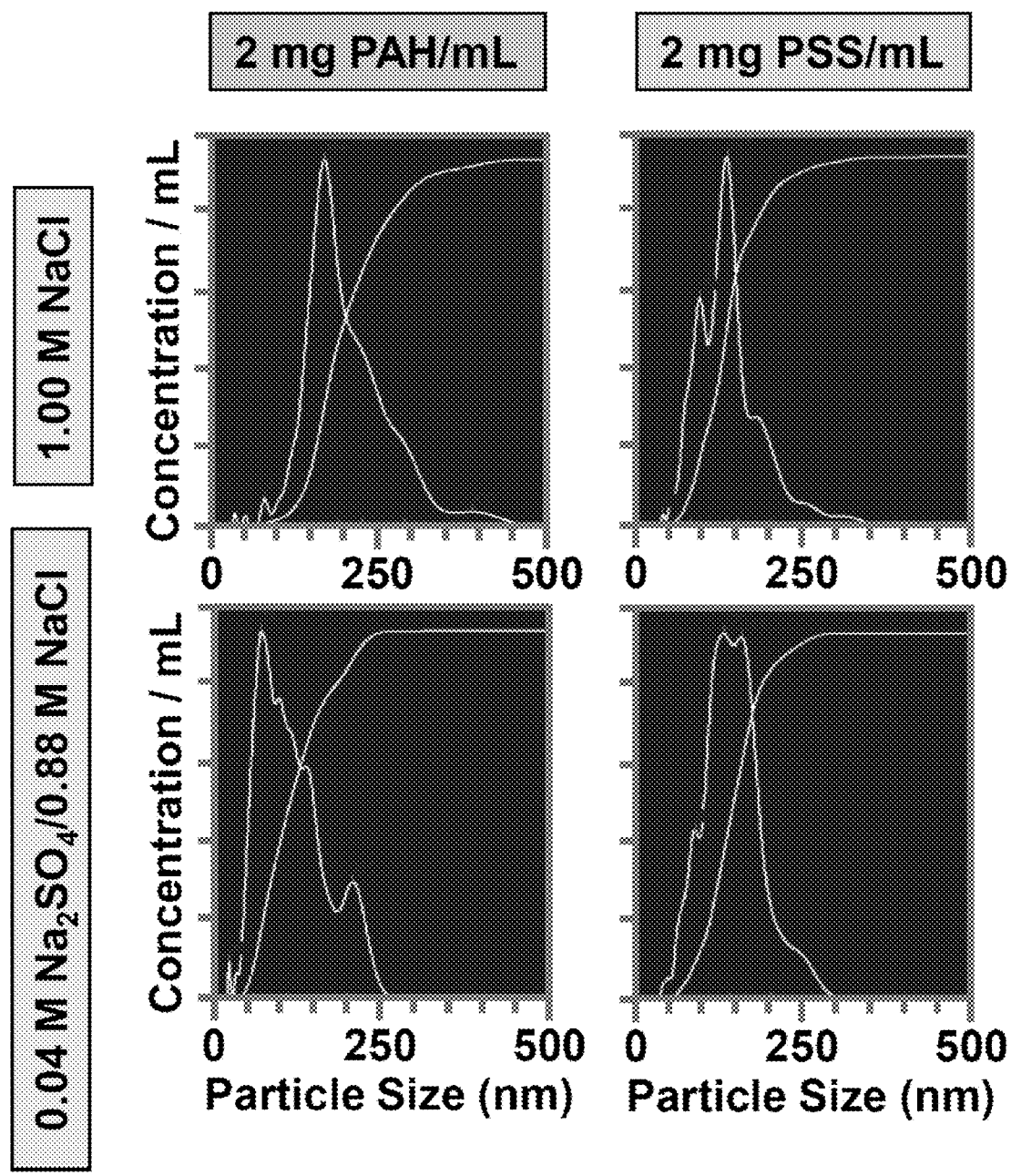
FIG. 8 shows light scattering results presented as relative particle concentrations vs. particle size are shown for PSS and PAH polyelectrolytes in 1.00 M NaCl(aq) and 0.04 M $Na_2SO_4$/0.88 M NaCl (aq) solutions. The particle size distribution (left curve) and integrated distribution curve (right curve) for polyelectrolyte aggregates present in each solution are shown.

Evidence of chain-bridging interactions in the µ=1.00 M solutions (in contrast to previous reports of gelation in low ionic strength solutions (Brunne et al., "Biomimetic Synthesis of Silica Nanospheres Depends on the Aggregation and Phase Separation of Polyamines in Aqueous Solution" *Phys. Chem. Chem. Phys.* 2004, 6, 854-857; Murthy et al., "Nanoparticle-assembled Capsule Synthesis: Formation of Colloidal Polyamine-Salt Intermediates" *J. Phys. Chem. B* 2006, 110, 25619-25627; Tikhonenko et al., "Enzyme-polyelectrolyte Complex: Salt Effects on the Reaction of Urease with Polyallylamine" *Russ. J. Phys. Chem. A* 2009, 83, 1781-1788; Wernersson et al., "Effect of Association with Sulfate on the Electrophoretic Mobility of Polyarginine and Polylysine" *J. Phys. Chem. B* 2010, 114, 11934-11941; Dragan et al., "Influence of Low-Molecular-Weight Salts on the Formation of Polyelectrolyte Complexes Based on Polycations with Quaternary Ammonium Salt Groups in the Main Chain and Poly(sodium acrylate)" *Eur. Polym. J.* 2001, 37, 1571-1575; Ghimici et al., "Behaviour of Cationic Polyelectrolytes upon Binding of Electrolytes: Effects of Polycation Structure, Counterions, and Nature of the Solvent" *Colloid Polym. Sci.* 2002, 280, 130-134; Kovačević et al., "The Influence of Ionic strength, Electrolyte Type, and Preparation Procedure on Formation of Weak Polyelectrolyte Complexes" *Colloids Surf. A* 2007, 302, 107-112; Yu et al., "Synthesis of Near-Infrared-Absorbing Nanoparticle-Assembled Capsules" *Chem. Mater.* 2007, 19, 1277-1284; Ghimici et al., "Interaction of the Low Molecular Weight Salts with Cationic Polyelectrolytes" *J. Polym. Sci. B: Polym. Phys.* 1997, 35, 2571-2581) is obtained by comparing the light scattering data (FIG. 8 and Table 4) for PAH and PSS aggregates in NaCl solutions with and without added SO$_4$$^{2-}$ anions. In general, aggregation in the sulfate-free solutions is associated with polyelectrolyte chain coiling due to partial neutralization by solution Na$^+$ or Cl$^-$ counterions (Hammond, "Form and Function in Multilayer Assembly: New Applications at the Nanoscale" *Adv. Mater.* 2004, 16, 1271-1293; Ariga et al., "Layer-by-layer Assembly as a Versatile Bottom-up Nanofabrication Technique for Exploratory Research and Realistic Application" *Phys. Chem. Chem. Phys.* 2007, 9, 2319-2340; Ariel et al., "Polyelectrolyte Persistence Length: Attractive Effect of Counterion Correlations and Fluctuations" *Europhys. Lett.* 2003, 61, 67-73; Block et al., "Equilibrium and Nonequilibrium Features in the Morphology and Structure of Physisorbed Polyelectrolyte Layers" *J. Phys. Chem. B* 2011, 115, 7301-7313; Carrillo et al., "Polyelectrolytes in Salt Solutions: Molecular Dynamics Simulations" *Macromolecules* 2011, 44, 5798-5816). However, the aggregation behavior changes dramatically in the presence of SO$_4$$^{2-}$ anions for PAH but not for PSS. Specifically, in 1.00 M NaCl solution, PAH aggregates have the lowest concentration and the largest size measured, while in the presence of SO$_4$$^{2-}$ (0.04 M Na$_2$SO$_4$/0.88 M NaCl), their concentration increases by over a factor of 6 and the size significantly decreases.

TABLE 4

Light Scattering Analysis of PAH and PSS Salt Solutions

| Solution Composition[a] | No.[b] | Mean Diameter[c] (nm) | D50 Value[d] (nm) | Particle Concentration[e] (particles/mL) |
|---|---|---|---|---|
| PAH (0.04M $Na_2SO_4$/0.88M NaCl) | 8 | 133 ± 27 | 116 ± 16 | (9.35 ± 0.98) × $10^8$ |
| PSS (0.04M $Na_2SO_4$/0.88M NaCl) | 7 | 147 ± 16 | 138 ± 12 | (3.53 ± 1.13) × $10^8$ |
| PAH (1.00M NaCl) | 4 | 186 ± 10 | 183 ± 9 | (1.50 ± 0.18) × $10^8$ |
| PSS (1.00M NaCl) | 4 | 144 ± 3 | 128 ± 17 | (6.02 ± 2.45) × $10^8$ |

[a]Identity of polyelectrolyte and salt in soution analyzed. Polyelectrolyte is present at 2 mg/mL in each solution. Fresh polyelectrolyte solution was used for each measurement. Sample platen was prepared as described.
[b]Number of measurements made.
[c]Estimated average polyelectrolyte aggregate diameter ± standard deviation in nm.
[d]Estimated polyelectrolyte aggregate size ± standard deviation in nm for which half the aggregates are larger and half are smaller.
[e]Estimated polyelectrolyte aggregate concentration ± standard deviation in particles/mL solution.

This behavior of PAH aggregates indicates that $SO_4^{2-}$ neutralizes PAH chain charge far more effectively than does $Cl^-$. The resulting large numbers of compact PAH aggregates ultimately nucleate gel formation at $[SO_4^{2-}]>0.05$ M, in agreement with previous observations (Brunner et al., "Biomimetic Synthesis of Silica Nanospheres Depends on the Aggregation and Phase Separation of Polyamines in Aqueous Solution" *Phys. Chem. Chem. Phys.* 2004, 6, 854-857; Murthy et al., "Nanoparticle-assembled Capsule Synthesis: Formation of Colloidal Polyamine-Salt Intermediates" *J. Phys. Chem. B* 2006, 110, 25619-25627; Tikhonenko et al., "Enzyme-polyelectrolyte Complex: Salt Effects on the Reaction of Urease with Polyallylamine" *Russ. J. Phys. Chem. A* 2009, 83, 1781-1788). The neutralization of PAH chain charge by $SO_4^{2-}$ anions appears to be particularly effective, as the analogous interactions of the $PSS\text{---}SO_3^-$ groups with $Na^+$ (or $Mg^{2+}$) cations do not induce gelation in any of the solutions.

Figure 9:
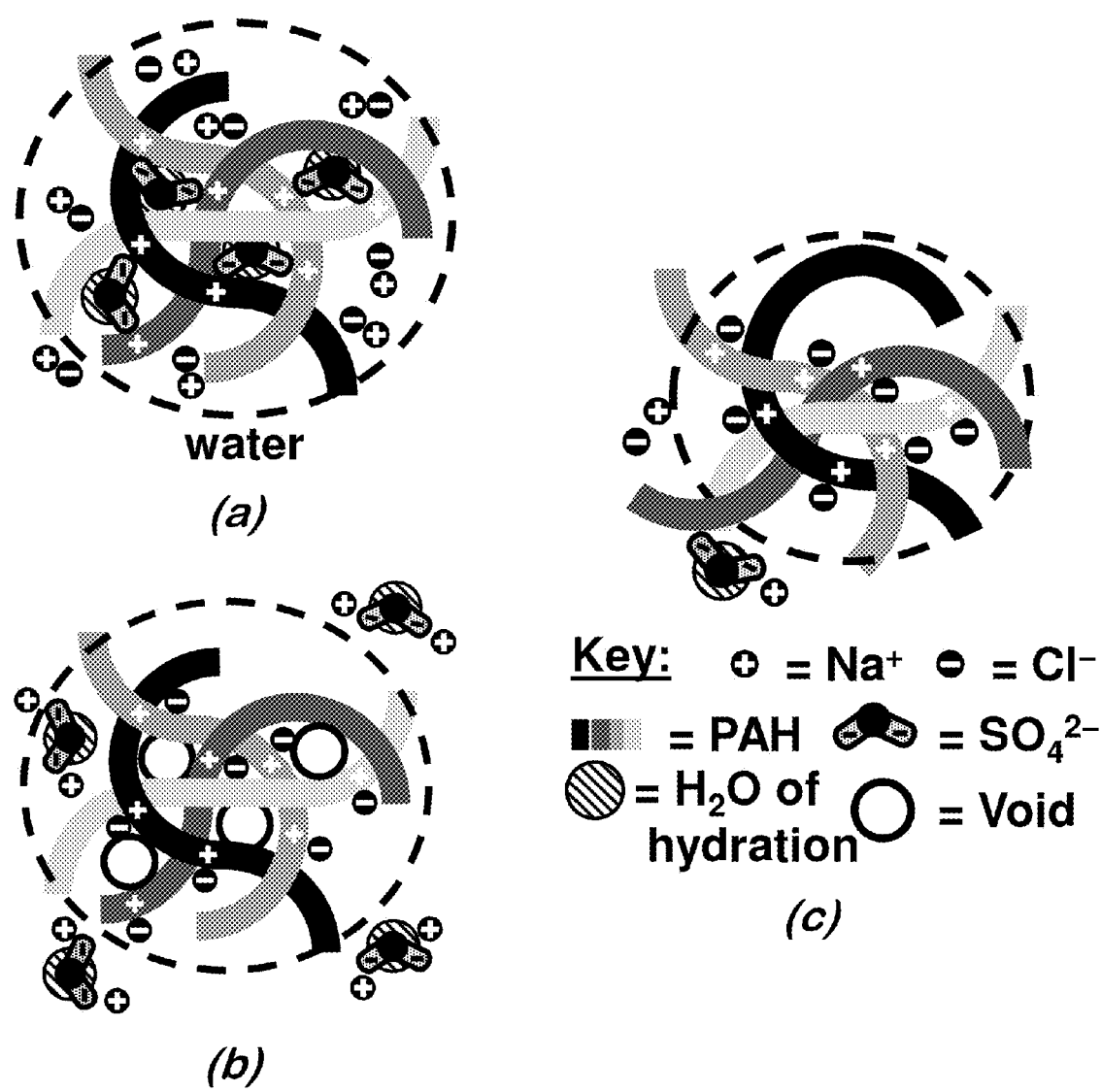
FIG. 9 shows the rinsing model for PAH particle precipitation. An intact PAH aggregate in a $\mu=1.00$ M ionic strength solution is diluted in water (A). Expulsion of excess $SO_4^{2-}$ from the aggregate, accompanied by partial deprotonation of the PAH amine N sites and Cl$^-$ exchange to maintain electroneutrality, occurs (B). Because $SO_4^{2-}$ tightly binds and organizes water in its vicinity, its removal during dilution dehydrates the aggregate. Subsequent collapse of the PAH chains to fill the voids left by the rapidly departing $SO_4^{2-}$ anions permits formation of stabilizing hydrogen bonds among deprotonated amine N sites on the PAH chains, raising the local PAH concentration above its solubility in water and precipitating the PAH particle (C).

Interactions of PAH solutions with water provide further insight into the properties of PAH aggregates: addition of PAH solutions (μ=1.00 M) containing $SO_4^{2-}$ or $HPO_4^{2-}$ dianions to water resulted in a faint precipitate exhibiting a bluish-white Tyndall effect, which suggests aggregates of ≥35-40 nm in size. No precipitate was observed upon addition of these PAH solutions to a mixed salt solution (containing the same $SO_4^{2-}$ or $HPO_4^{2-}$ dianion), or upon addition of PAH solution containing only univalent salts to water. PAH precipitation in this manner suggests expulsion of excess $SO_4^{2-}$ during aqueous dilution with concomitant deprotonation of amine sites, resulting in dehydration and collapse of PAH aggregates (FIG. 9).

Example 7

PEML Rinsing

To avoid precipitation of PAH (FIG. 9), reproducible preparation of PEMLs from solutions containing dianions required the use of a "salt rinse" protocol, whereby each deposited film was rinsed sequentially with a polyelectrolyte-free solution having the same salt composition as the deposition solution, then with 1.00 M NaCl (aq) solution, and finally with water, followed by drying in a $N_2$ gas stream. PEMLs rinsed only with water (or not dried) exhibited increased UV absorbance, thickness, and roughness and a hazy appearance (Table 2). Similar effects of water rinsing were similarly traced to the deposition and inclusion of PAH particles in the PEML, ascribing the formation of those particles to the interaction of $SO_4^{2-}$ anions, rather than $Mg^{2+}$ cations, with the PAH amine sites (Bassim et al., "Layer-by-layer Assembly of Heterogeneous Modular Nanocomposites" *J. Phys. Chem. C* 2012, 116, 1694-1701). That conclusion is reaffirmed by observing that PEMLs exhibit identical properties whether prepared using only univalent ions or in the presence of $MgCl_2$ (cf., Tables 2 and 5), which indicates that PAH—$Mg^{2+}$ interactions are unlikely contributors to PAH precipitation.

TABLE 5

Properties of Multilayer Films Deposited from Salt Solutions (Salt Rinse Protocol)

| | | thickness (nm) | | roughness (nm) | |
|---|---|---|---|---|---|
| salt[a] (substrate)[b] | abs.[c] | total film[d] | bilayer[e] | $r_q^f$ | $N^g$ |
| $NaCl^h$ (Q) | 0.7558 | — | — | — | — |
| $NaCl^h$ (Si) | — | 97.5 ± 2.2 | 4.1 ± 0.09 | 0.8 ± 0.4 | 3 |
| $NaF^h$ (Q) | 0.7620 | 82.5 ± 4.7 | 4.1 ± 0.2 | 1.59 ± 0.03 | 3 |
| $NaF^h$ (Si) | — | 93.9 ± 8.2 | 3.9 ± 0.3 | — | — |
| $NaH_2PO_4^h$ (Q) | 0.7434 | 85.4 ± 3.9 | 4.3 ± 0.2 | 0.86 ± 0.06 | 4 |
| $NaH_2PO_4^h$ (Si) | — | 96.5 ± 1.1 | 4.02 ± 0.04 | 0.60 ± 0.03 | 3 |
| $Na(Acetate)^h$ (Q) | 0.7412 | 77.3 ± 0.9 | 3.78 ± 0.04 | 0.71 ± 0.02 | 3 |
| $Na(Acetate)^h$ (Si) | — | 90.8 ± 1.7 | 3.78 ± 0.04 | 0.9 ± 0.4 | 3 |
| $MgCl_2^i$ (Q) | 0.7358 | 88.6 ± 1.8 | 4.43 ± 0.09 | 2.3 ± 0.5 | 2 |
| $MgCl_2^i$ (Si) | — | 93.2 ± 1.4 | 3.88 ± 0.06 | 1.0 ± 0.5 | 4 |
| $MgSO_4^j$ (Q) | 1.5001 | — | — | — | — |
| $MgSO_4^j$ (Si) | — | 228.6 ± 6.3 | 9.5 ± 0.3 | 1.2 ± 0.4 | 3 |
| $MgSO_4^i$ (Q) | 1.8176 | 226.8 ± 3.7 | 11.3 ± 0.2 | 1.1 ± 0.1 | 2 |
| $MgSO_4^i$ (Si) | — | 274 ± 13 | 11.4 ± 0.5 | — | — |
| $Na_2HPO_4^k$ (Q) | 1.9078 | — | — | — | — |
| $Na_2HPO_4^k$ (Si) | — | 286.9 ± 3.7 | 12.0 ± 0.2 | 1.4 ± 0.4 | 3 |

TABLE 5-continued

Properties of Multilayer Films Deposited from Salt Solutions (Salt Rinse Protocol)

| | | thickness (nm) | | roughness (nm) | |
|---|---|---|---|---|---|
| salt[a] (substrate)[b] | abs.[c] | total film[d] | bilayer[e] | $r_q$[f] | N[g] |
| Na$_2$Oxalate[i] (Q) | 1.4746 | 192.8 ± 5.2 | 9.6 ± 0.3 | 1.93 ± 0.05 | 5 |
| Na$_2$Oxalate[i] (Si) | — | 227.0 ± 12.0 | 9.4 ± 0.5 | 0.9 ± 0.2 | 3 |
| Na$_2$Tartrate[j] (Q) | 1.0557 | 119.0 ± 2.2 | 6.0 ± 0.1 | 1.34 ± 0.39 | 3 |
| Na$_2$Tartrate[j] (Si) | — | 139.0 ± 2.3 | 5.67 ± 0.09 | 0.78 ± 0.04 | 3 |
| Na$_2$Maleate[j] (Q) | 0.9829 | — | — | — | — |
| Na$_2$Maleate[j] (Si) | — | 144.8 ± 3.1 | 6.0 ± 0.1 | 1.10 ± 0.18 | 3 |
| Na$_2$Fumarate[j] (Q) | 0.7970 | — | — | — | — |
| Na$_2$Fumarate[j] (Si) | — | 104.1 ± 2.6 | 4.3 ± 0.1 | 1.54 ± 0.97 | 3 |
| Na$_2$Malonate[j] (Q) | 0.8335 | — | — | — | — |
| Na$_2$Malonate[j] (Si) | — | 114.6 ± 2.6 | 4.8 ± 0.1 | 0.92 ± 0.10 | 3 |
| Na$_2$Succinnnate[j] (Q) | 0.7826 | — | — | — | — |
| Na$_2$Succinnnate[j] (Si) | — | 97.1 ± 9.0 | 4.00 ± 0.37 | 0.94 ± 0.07 | 3 |

[a]Identity of the univalent or divalent ion salt present in each polyelectrolyte solution (and initial rinse solution) during multilayer deposition. The listed salts are present at 0.05M concentration, unless otherwise noted, with sufficient NaCl added to fix the solution ionic strength at μ = 1.00M.
[b]Identity of the substrate coated with the multilayer. Q = quartz and Si = silicon wafer. Substrates were coated with a chemisorbed EDA organosiloxane monolayer prior to multilayer deposition. Multilayer films have structure: Substrate-EDA/(PSS/PAH)$_x$ (x = 20 for quartz (Q) and x = 24 for silicon (Si) substrates).
[c]UV absorbance of the multilayer film at 225 nm on a quartz substrate.
[d]Thickness (±std. dev.) of the multilayer film as determined by AFM.
[e]Average thickness (±std. dev.) of a single PSS/PAH bilayer within the multilayer film, calculated by division of the total film thickness by the number of bilayers deposited, x, with x = 20 (quartz) or x = 24 (Si).
[f]Root-mean-square roughness, $r_q$, (±std. dev.) from AFM measurements.
[g]Number of measurements taken to determine roughness values.
[h]Solution also contains 0.95M NaCl for ionic strength adjustment.
[i]Solution also contains 0.85M NaCl for ionic strength adjustment.
[j]Solution also contains 0.80M NaCl for ionic strength adjustment.
[k]PAH solubility limits the Na$_2$HPO$_4$ concentration to 0.011M, with 0.957M NaCl, and with 0.010M NaH$_2$PO$_4$ added for ionic strength and pH buffer control.

Example 8

Effects of Anions on PEML Properties

Among the PEMLs prepared (via the salt rinse protocol) in the presence of various ions listed in FIG. 7, Table 5 reveals the main systematic differences to be between films deposited in the presence of univalent vs divalent anions, while the identities of the cations appear to be unimportant. For each of the Na$^+$ (or Mg$^{2+}$) salts of the univalent Cl$^-$, F$^-$, H$_2$PO$_4^-$, and H$_3$CCOO$^-$ (acetate) anions, the UV absorbance at 225 nm (A$_{225}$) and bilayer thickness (T$_b$) of the resulting PEMLs are nearly identical and do not significantly change when the triple water rinse protocol rather than salt rinse protocol is used (cf., Tables 2 and 5). The A$_{225}$ and T$_b$ values increase dramatically, however, for films prepared using divalent anions, such as SO$_4^{2-}$, HPO$_4^{2-}$, or C$_2$O$_4^{2-}$ (oxalate); the parameters of PEMLs prepared using dicarboxylate salts also vary with the identity of the dicarboxylates.

Example 9

Film Compositions

Figure 3:
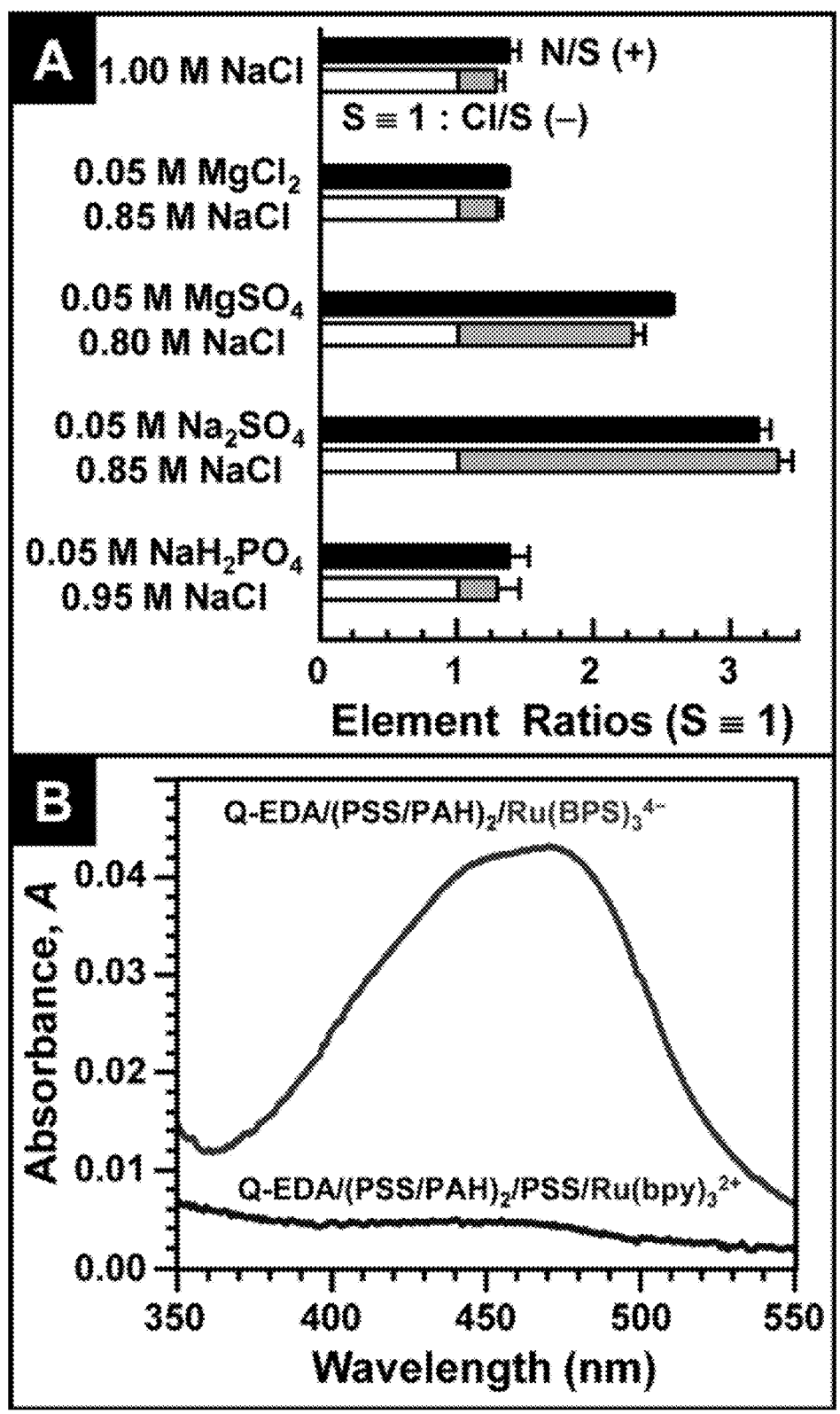
FIG. 3 shows (A) Comparisons of the amounts of N, S, and Cl present in PAH-terminated PSS/PAH PEMLs prepared using $\mu=1.00$ M solutions containing $SO_4^{2-}$ dianion and representative univalent anions. Histograms representing the XPS Cl 2p signal due to Cl$^-$ anion (gray) and the N 1s signal due to PAH amine sites (black) are referenced to the S 2p signal due to the sulfonate sites of the PSS (white), which is set to unity to facilitate comparisons and estimate element ratios. (B) Visible absorbance spectra of the MLCT bands associated with $Ru(BPS)_3^{4-}$ (structure shown in FIG. 7) adsorbed to a terminal PAH layer in a Q-EDA/(PSS/PAH)$_2$ PEML (upper spectrum, BPS=disodium bathophenanthrolinesulfonate) and $Ru(bpy)_3^{2+}$ adsorbed to a terminal PSS layer in a Q-EDA/(PSS/PAH)$_2$/PSS PEML (lower spectrum, bpy=2,2'-bipyridine) for estimation of the [—NH$_3^+$]/[—SO$_3^-$] ratio using Eq. (4). PEMLs were deposited from 0.037 M $Na_2SO_4$/0.889 M NaCl (aq) polyelectrolyte solutions using the salt rinse protocol (Table 7).

To interpret the observations summarized in Table 5, the composition of the PEMLs was examined, with particular emphasis on films prepared in the presence of SO$_4^{2-}$ (FIG. 3). In XPS analysis (FIG. 3A) of representative PAH-terminated films, no mobile cations (Mg$^{2+}$ or Na$^+$) were detected after rinsing, in agreement with previous observations. Retention of anions, on the other hand, depended upon the rinse protocol. Films rinsed using a solution having a salt composition identical to the final PAH treatment solution (followed by a water rinse) revealed the presence of the unique SO$_4^{2-}$ or H$_2$PO$_4^-$ anions, as appropriate, in addition to Cl$^-$. In films that underwent a complete salt rinse protocol, i.e., received an additional rinse in 1.0 M NaCl (aq) solution prior to the final water rinse, all mobile anions were completely replaced by Cl$^-$, as shown in FIG. 3A. The charge balance, observed in agreement with previous reports (Schlenoff et al., "Charge and Mass Balance in Polyelectrolyte Multilayers" *J. Am. Chem. Soc.* 1998, 120, 7626-7634; Laurent et al., "Multilayer Assemblies of Redox Polyelectrolytes" *Langmuir* 1997, 13, 1552-1557) was confirmed within the ca. 10 nm XPS sampling depth by quantifying the S 2p doublet [BE(S 2p$_{3/2}$)≈168.1 eV] due to the SO$_3^-$ groups of PSS, Cl 2p doublet [BE(Cl 2p$_{3/2}$)≈197.9 eV] due to chloride ions, and N is signal at BE≈402 eV characteristic of protonated amines in PAH. Electroneutrality at the film surface is thus maintained by pairing protonated amines of PAH with anionic sulfonates of PSS and with mobile Cl$^-$ ions.

The presence of 0.05 M univalent anions vs divalent SO$_4^{2-}$ anions produces the most dramatic effect on the film composition. In the presence of univalent anions, PAH and PSS adsorb in a nearly 1:1 ratio and few Cl$^-$ ions are required to neutralize the excess PAH component. In contrast, ca. 2-3 times more PAH than PSS is deposited from solutions containing SO$_4^{2-}$. Therefore, those films contain large amounts of Cl$^-$ ions to charge-compensate the terminal PAH layers.

FIG. 3B corroborates this observation via relative measurements of the levels of accessible protonated cationic amine and deprotonated anionic sulfonate sites for PAH- and PSS-terminated PEML films, respectively, using electrostatically bound Ru dyes (note FIG. 7). Electrostatic binding of anionic Ru(BPS)$_3^{4-}$ dye to a Q-EDA/(PSS/PAH)$_2$ PEML and cationic Ru(bpy)$_3^{2+}$ dye to a Q-EDA/(PSS/PAH)2/PSS film readily occurs from aqueous dye solutions. Measurement of the absorbance of the bound Ru dyes provides an estimate of [—NH3$^+$]/[—SO$_3^-$]>1.8 for PEMLs prepared using 0.037 M $Na_2SO_4$/0.889 M NaCl solutions. This estimate is in good agreement with the XPS results from FIG. 3A for the PEML prepared with slightly higher [$SO_4^{2-}$] (0.05 M $Na_2SO_4$/0.85 M NaCl) and suggests that deposition of excess PAH is facilitated by increasing [$SO_4^{2-}$].

The release of $Ru(BPS)_3^{4-}$ dye from the PAH during PSS treatment indicates that separate populations of strongly and weakly bound dye exist in the terminal PAH layer of the growing PSS/PAH/Ru film. Therefore, at least two separate environments, presumably corresponding to extended and coiled PAH chains (Feldötö et al., "Influence of Salt and Rinsing Protocol on the Structure of PAH/PSS Polyelectrolyte Multilayers" *Langmuir* 2010, 26, 17048-17057), are present in the terminal PAH layer during dye deposition. FIG. 5C indicates that the process described above leads to reproducible fabrication of PEMLs comprising PSS/PAH/Ru trilayers. Linear plots of absorbance vs. number of PSS/PAH/Ru trilayers are observed at 225 nm, 286 nm, and 460 nm. The linearity of the plot at 225 nm, where both the PSS and Ru complex absorb light, is consistent with maintenance of the reproducible linear film growth mode exhibited by the corresponding PSS/PAH bilayer PEML shown in FIG. 5A. The ratio of the slopes for the 286 nm and 460 nm plots (i.e., (0.093±0.002)/(0.024±0.001)≅3.87±0.23), where only the Ru dye absorbs light, is equivalent to the extinction coefficient ratio for the solution phase Ru complex (i.e., $\epsilon'$(286 nm)/$\epsilon'$(460 nm)=(9.08±0.09)×$10^4$ L·mole$^{-1}$·cm$^{-1}$/(2.50±0.03)×$10^4$ L·mole$^{-1}$·cm$^{-1}$≅3.63±0.08). This behavior, together with the agreement between the solution and film spectra of the Ru dye in FIG. 5B, indicates that incorporation of the Ru complex into the PEML occurs without degradation (note also FIG. 10). Although the PSS/PAH/Ru trilayer PEMLs contain less PSS than the corresponding PSS/PAH bilayer films prepared from 0.04 M $Na_2SO_4$/0.88 M NaCl (aq) polyelectrolyte solutions, film thickness is increased. In fact, a Si-EDA/(PSS/PAH/Ru)$_{20}$ film exhibits a PSS/PAH/Ru trilayer thickness of ca. 9.0±0.2 nm compared to a PSS/PAH bilayer thickness of ca. 7.6±0.1 nm for the corresponding Si-EDA/(PSS/PAH)$_{20}$ film in Table 7. However, the change in thickness is accompanied by little increase in roughness, with $r_q$ values of 1.34±0.14 nm and 1.22±0.09 nm determined for the Si-EDA/(PSS/PAH/Ru)$_{20}$ and Si-EDA/(PSS/PAH)$_{20}$ films, respectively.

Example 10

Sulfate Solution Concentration

The unusual behavior of PEMLs prepared from solutions containing $SO_4^{2-}$, as summarized in FIG. 3 and Table 5, prompted examining these PSS/PAH multilayers further. FIG. 4A (Table 6) shows a plot of the absorbance at 225 nm due to the PSS film component vs the mole fraction of $SO_4^{2-}$ in polyelectrolyte solutions containing varying concentrations of $Na_2SO_4$ and NaCl at μ=1.00 M total ionic strength. The mole fraction $SO_4^{2-}$ concentration, χ, in this case provides a relative measure of the competitive electrostatic binding of $SO_4^{2-}$ and $Cl^-$ ions at PAH protonated amine sites in solution. As $Na_2SO_4$ replaces a portion of the NaCl in the polyelectrolyte treatment solutions, the 225 nm absorbance of the Q-EDA/(PSS/PAH)$_{20}$ PEML film increases from ca. 0.75, slowly at first and then more rapidly as solution $SO_4^{2-}$ levels rise.

TABLE 6

Dependence of Multilayer Films Properties on Solution Sulfate Concentration Associated with FIG. 4A (Salt Rinse Protocol)

| salt[a] | concentration[c] | | abs.[d] | thickness (nm) | | roughness (nm) | |
|---|---|---|---|---|---|---|---|
| (substrate)[b] | $Na_2SO_4$ | NaCl | | total film[e] | bilayer[f] | $r_q{}^g$ | $N^h$ |
| NaCl (Q) | 0.00 | 1.00 | 0.7558 | — | — | — | — |
| NaCl (Si) | 0.00 | 1.00 | — | 97.5 ± 2.2 | 4.10 ± 0.1 | 0.8 ± 0.4 | 3 |
| $Na_2SO_4$ (Q) | 0.05 | 0.85 | 1.8176 | 226.8 ± 3.7 | 11.3 ± 0.2 | 1.14 ± 0.1 | 3 |
| $Na_2SO_4$ (Si) | 0.05 | 0.85 | — | 274.2 ± 12.8 | 11.4 ± 0.5 | — | — |
| $Na_2SO_4$ (Q) | 0.043 | 0.871 | 1.2806 | — | — | — | — |
| $Na_2SO_4$ (Si) | 0.043 | 0.871 | — | 175.1 ± 0.2 | 7.3 ± 0.1 | 0.64 ± 0.03 | 3 |
| $Na_2SO_4$ (Q) | 0.04 | 0.88 | 1.2425 | — | — | — | — |
| $Na_2SO_4$ (Si) | 0.04 | 0.88 | — | 151.5 ± 1.9 | 7.6 ± 0.1 | 1.22 ± 0.09 | 3 |
| $Na_2SO_4$ (Q) | 0.037 | 0.889 | 1.1105 | — | — | — | — |
| $Na_2SO_4$ (Si) | 0.037 | 0.889 | — | 148.0 ± 2.3 | 6.2 ± 0.1 | 1.5 ± 1.0 | 5 |
| $Na_2SO_4$ (Q) | 0.03 | 0.91 | 0.9785 | — | — | — | — |
| $Na_2SO_4$ (Si) | 0.03 | 0.91 | — | 134.6 ± 3.0 | 5.6 ± 0.1 | 0.8 ± 0.3 | 3 |
| $Na_2SO_4$ (Q) | 0.01 | 0.97 | 0.8061 | — | — | — | — |
| $Na_2SO_4$ (Si) | 0.01 | 0.97 | — | 103.5 ± 1.1 | 4.3 ± 0.1 | 0.9 ± 0.1 | 3 |

[a]Identity of the salt present in each polyelectrolyte solution (and initial rinse solution for sulfate-containing solutions) during multilayer deposition.
[b]Identity of the substrate coated with the multilayer. Q = quartz and Si = silicon wafer. Substrates were coated with a chemisorbed EDA organosiloxane monolayer prior to multilayer deposition. Multilayer films have structure: Substrate-EDA/(PSS/PAH)$_x$ (x = 20 or quartz (Q) and x = 24 for silicon (Si) substrates).
[c]Left column indicates the molar concentration of $Na_2SO_4$ in the polyelectrolyte treatment solution and first rinse solutions. Right column indicates the concentration of NaCl present to bring the solution ionic strength to μ = 1.00M.
[d]UV absorbance of the multilayer film at 225 nm on a quartz substrate.
[e]Thickness ± std. dev. of the multilayer film as determined by AFM.
[f]Average thickness (± std. dev.) of a single PSS/PAH bilayer within the multilayer film, calculated by division of the total film thickness by the number of bilayers deposited, x, with x = 20 (quartz) or x = 24 (Si).
[g]Root-mean-square roughness, $r_q$, (± std. dev.) from AFM measurements.
[h]Number of measurements taken to determine roughness values.

The increase in PEML absorbance due to the presence of $SO_4^{2-}$, ΔA, can be estimated for each $SO_4^{2-}$ solution in FIG. 4A as the difference between the absorbances of the respective PEML and a PEML deposited from 1.00 M NaCl (aq). The ΔA, and therefore the amount of PSS deposited, grows exponentially with increasing solution $SO_4^{2-}$ levels, as shown in FIG. 4B. A similar exponential behavior is observed in FIG. 4B for the incremental increase in PEML total thickness, ΔT, defined as the thickness difference between PEMLs deposited from solutions with and without $SO_4^{2-}$. Consequently, film absorbance and thickness are linearly correlated, presumably because increasing solution $SO_4^{2-}$ levels promotes deposition of additional PSS and PAH at fixed ratios (vide infra), which increases absorbance and thickness in tandem.

The $Ru(bpy)_3(ClO_4)_2$ and $Na_4Ru(BPS)_3$ complexes were also used to estimate the relative concentrations of available amine and sulfonate sites present on terminal PSS and PAH polyelectrolyte layers, respectively, for PSS/PAH multilayers deposited from 0.037 M $Na_2SO_4$/0.889 M NaCl solutions. A Q-EDA/(PSS/PAH)$_2$/PSS film was treated 4 h with aqueous $4.3 \times 10^{-4}$ M $Ru(bpy)_3(ClO_4)_2$ solution, followed by a triple water rinse, to electrostatically bind $Ru(bpy)_3^{2+}$ cation to available $—SO_3^-$ groups present in the terminal PSS layer of the film. Analogous treatment of a Q-EDA/(PSS/PAH)$_2$ film with aqueous $4.0 \times 10^{-4}$ M $Na_4Ru(BPS)_3$ solution bound $Ru(BPS)_3^{4-}$ anion to available $—NH3^+$ sites on the terminal PAH layer in this film. Binding occurs without decomposition of the dyes, as shown by maintenance of dye fluorescence in the films (note FIG. 10) and observation of their characteristic metal-to-ligand charge-transfer (MLCT) absorbance bands near ca. 460 nm. The surface concentration of each adsorbed Ru complex (i.e., [Ru], mole·cm$^{-2}$) was estimated from the UV-visible absorbance of the multilayer film (i.e., A/2, where the factor "2" accounts for the presence of multilayer film on both sides of the quartz substrate) and its extinction coefficient (i.e., $\epsilon$, cm$^2$·mole$^{-1}$) via Beer's law using Eq. (3):

$$[Ru] = A/(2\epsilon) \quad (3)$$

Taking a ratio of [Ru] terms from Eq. (3) for the bound $Ru(BPS)_3^{4-}$ and $Ru(bpy)_3^{2+}$ species and recognizing that each $Ru(bpy)_3^{2+}$ cation could bind at most two $—SO_3^-$ groups and each $Ru(BPS)_3^{4-}$ anion could bind at most six $—NH_3^+$ groups leads, after some simplification, to Eq. (4) as an estimate of the ratio of available amine sites at a terminal PAH layer to available sulfonate sites on a terminal PSS layer, $[—NH_3^+]/[—SO_3^-]$:

$$[—NH_3^+]/[—SO_3^-] \approx A'\epsilon''/(3A''\epsilon') \quad (4)$$

In Eq. (4), A' and $\epsilon'$ are values associated with bound $Ru(BPS)_3^{4-}$ anion and A" and $\epsilon''$ are values associated with bound $Ru(bpy)_3^{2+}$ cation. The $\epsilon' = 2.5 \times 10^7$ cm$^2$·mole$^{-1}$) and $\epsilon'' = 1.4 \times 10^7$ cm$^2$·mole$^{-1}$ values for the metal-to-ligand charge-transfer (i.e., MLCT) absorbance band at ~460 nm appropriate for complexes adsorbed to the polyelectrolyte surfaces were calculated from corresponding c (L·mole$^-$·cm$^{-1}$) values measured from UV-visible absorption maxima for aqueous solutions containing known concentrations of each complex using Eq. (5):

$$\epsilon(cm^2·mole^{-1}) = \epsilon(L·mole^{-1}·cm^{-1}) \times 1000 \ cm^3·L^{-1} \quad (5)$$

Use of Eq. (4) is strictly valid only if binding of the complex to the polyelectrolyte layer does not affect the oscillator strength of the electronic transition corresponding to the absorbance band. In fact, small shifts in the positions and bandwidths of the absorbance peak maxima are observed for both complexes in the experiment after binding to the polyelectrolyte layer (vide infra), suggesting that some small change in G likely occurs. Therefore, absorbance bands of the same parentage are selected in each complex (i.e., MLCT $d\pi$-$\pi$*) for the calculation in Eq. (4) in order to minimize the effect of $\epsilon$ perturbations.

Example 11

Linear Film Growth

Figure 4:
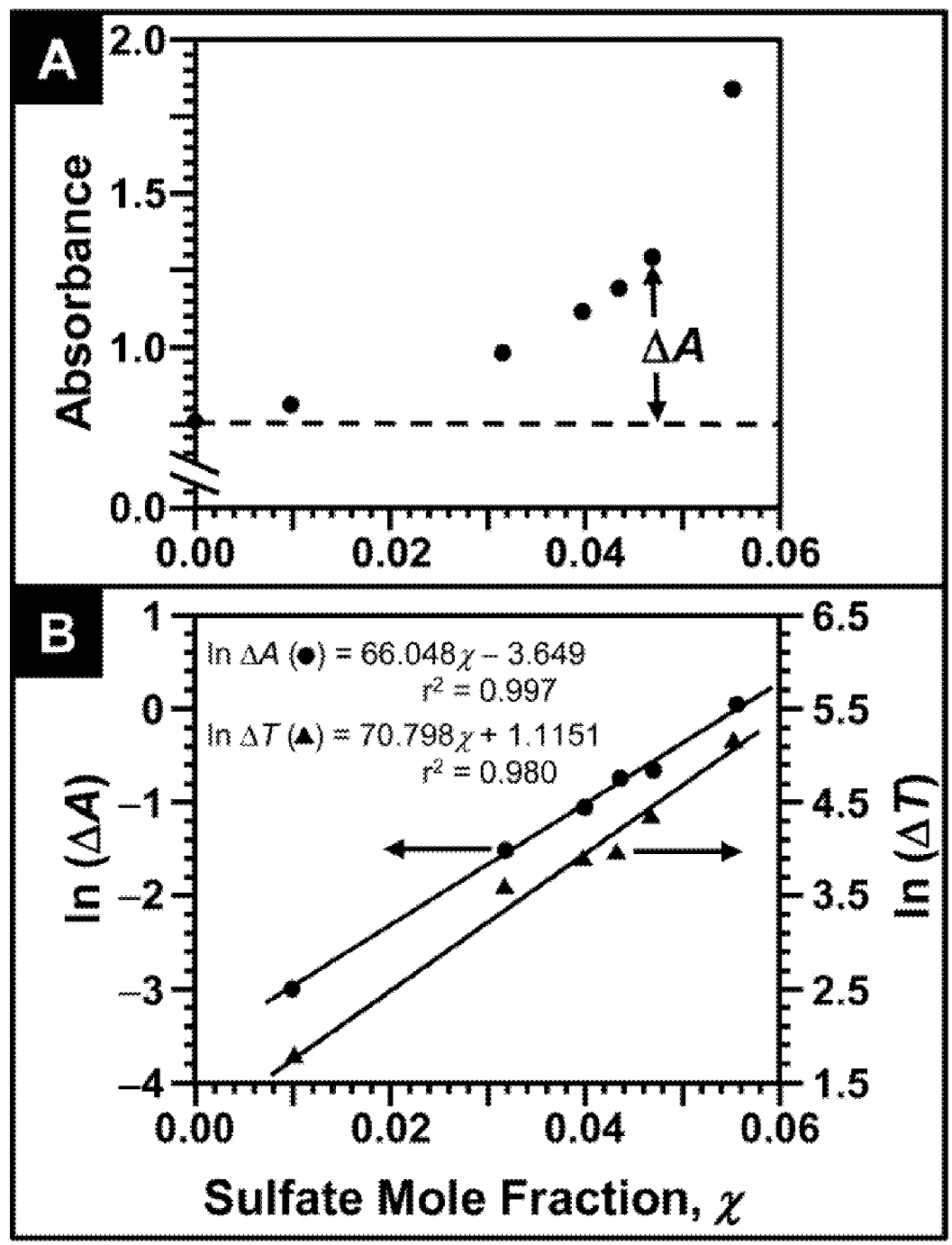
FIG. 4 shows (A) Absorbance at 225 nm due to the PSS component for PEMLs of structure Q-EDA/(PSS/PAH)$_{20}$ as functions of the mole fraction of $SO_4^{2-}$ present in $\mu=1.00$ M polyelectrolyte solutions containing mixed $Na_2SO_4$/NaCl salts. (B) Dependence of the logarithms of the excess PEML absorbance due to the presence of $SO_4^{2-}$, $\Delta A$ (circles), and total thickness, $\Delta T$ (triangles), on the $SO_4^{2-}$ mole fraction in the polyelectrolyte treatment solutions.
Figure 5:
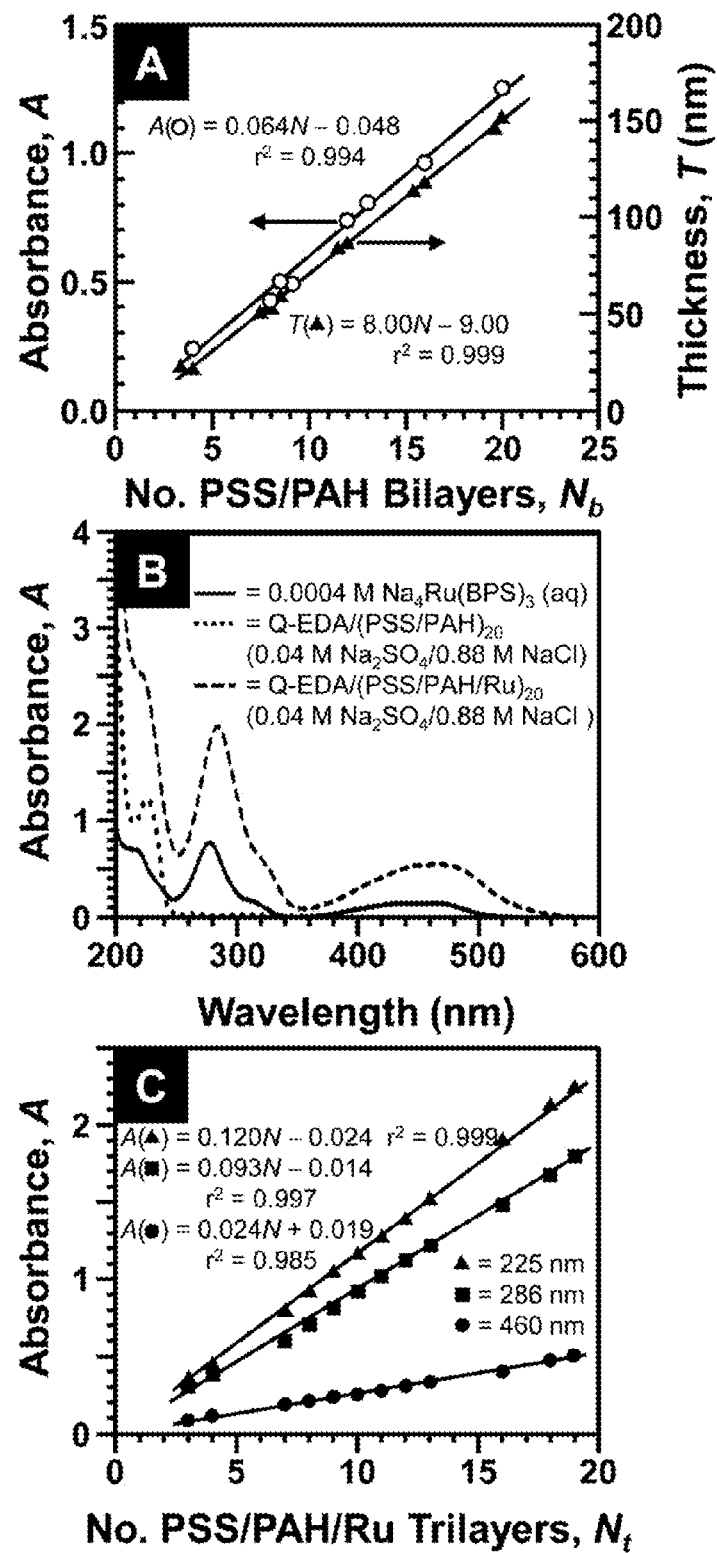
FIG. 5 shows (A) Linear dependence of the PEML absorbance at 225 nm, A (circles), and total film thickness, T (triangles), on the number of PSS/PAH bilayers deposited from 0.04 M $Na_2SO_4$/0.88 M NaCl (aq) polyelectrolyte solutions onto Q-EDA and Si-EDA substrates, respectively (note Table 7). (B) Absorbance spectra of a Q-EDA/(PSS/PAH)$_{20}$ PEML (dotted line), a Q-EDA/(PSS/PAH/Ru)$_{20}$ PEML (dashed line), and a Na$_4$Ru(BPS)$_3$ aqueous solution (solid line). PSS and PAH depositions for the PEMLs were made using 0.04 M $Na_2SO_4$/0.88 M NaCl (aq) polyelectrolyte solutions with the salt rinse protocol, whereas Na$_4$Ru(BPS)$_3$ was deposited from aqueous solution using the water rinse protocol (note Table 8). (C) Linear correlations of the absorbance of the Q-EDA/(PSS/PAH/Ru)$_x$ (x=3-20) PEML at 225 nm (triangles), 286 nm (squares), and 460 nm (circles) with the number of PSS/PAH/Ru trilayers deposited, $N_t$.

In FIG. 4, a different PEML was grown at each $SO_4^{2-}$ concentration, prompting the question of whether the exponential behavior in FIG. 4B predicts that a specific PEML deposited at a fixed solution $[SO_4^{2-}]$ will grow exponentially as well. Such exponential growth usually occurs when at least one of the polyelectrolyte components exhibits enhanced diffusivity within the multilayer stack. Exponential growth is typically observed for PEMLs prepared in high ionic strength solutions from weakly ionized components of low molecular weight, so any exponential PEML growth from the strongly ionized PAH and PSS would be among the rare exceptions.

PEML growth from 0.04 M $Na_2SO_4$/0.88 M NaCl solutions was examined for any signs of exponential behavior by monitoring the absorbance, thickness, and roughness as a function of the number of PSS/PAH bilayers (Table 7). The average PSS/PAH bilayer thickness increases from <7 nm to 7.1-7.6 nm for films containing >8 PSS/PAH bilayers, consistent with previous observations (Soltwedel et al., "Interdiffusion in Polyelectrolyte Multilayers" Macromolecules 2010, 43, 7288-7293) for PSS/PAH deposition from 1.00 M NaCl (aq) solutions. In addition, no correlation is observed between film roughness and the number of deposited PSS or PAH layers. These observations are indicative of linear, rather than exponential, PEML growth for films deposited from solutions having fixed $[SO_4^{2-}]$. Linear film growth consistent with previous observations (Soltwedel et al., "Interdiffusion in Polyelectrolyte Multilayers" Macromolecules 2010, 43, 7288-7293; Kiel et al. "Structural Characterization of a Spin-assisted Colloid-polyelectrolyte Assembly: Stratified Multilayer Thin Films" *Langmuir* 2010, 26, 18499-18502; Korneev et al., "Neutron Reflectivity Analysis of Self-assembled Film Superlattices with Alternate Layers of Deuterated and Hydrogenated Polysterenesulfonate and Polyallylamine" *Physica B* 1995, 213-214, 954-956) is confirmed for the PEMLs by linear correlations of both the film absorbance and total thickness with the number of deposited PSS/PAH bilayers (FIG. 5A).

TABLE 7

PEML Properties as Functions of the Number of PSS/PAH Bilayers (Salt Rinse Protocol)

| no.$^a$ | substrate$^b$/[film structure]$^c$ | abs.$^d$ | thickness (nm) | | roughness (nm) $r_q^g$ |
| | | | total film$^e$ | bilayer$^f$ | |
| --- | --- | --- | --- | --- | --- |
| 3.5 | Si/[(PSS/PAH)$_3$/PSS] | — | 21.8 ± 6.2 | 6.2 ± 0.3 | 1.85 ± 0.2 |
| 4 | Q/[(PSS/PAH)$_4$] | 0.2371 | — | — | — |
| 4 | Si/[(PSS/PAH)$_4$] | — | 20.3 ± 1.8 | 5.1 ± 0.5 | 1.4 ± 0.2 |
| 7.5 | Si/[(PSS/PAH)$_7$/PSS] | — | 50.7 ± 1.7 | 6.7 ± 0.2 | 1.7 ± 0.1 |
| 8 | Q/[(PSS/PAH)$_8$] | 0.4296 | — | — | — |
| 8 | Si/[(PSS/PAH)$_8$] | — | 53.3 ± 1.1 | 6.7 ± 0.1 | 1.48 ± 0.02 |

TABLE 7-continued

PEML Properties as Functions of the Number of PSS/PAH Bilayers (Salt Rinse Protocol)

| no.[a] | substrate[b]/[film structure][c] | abs.[d] | thickness (nm) total film[e] | bilayer[f] | roughness (nm) $r_q$[g] |
|---|---|---|---|---|---|
| 8.5 | Q/[(PSS/PAH)$_8$/PSS] | 0.5046 | — | — | — |
| 8.5 | Si/[(PSS/PAH)$_8$/PSS] | — | 60.1 ± 1.3 | 7.1 ± 0.2 | 1.46 ± 0.14 |
| 9 | Q/[(PSS/PAH)$_9$] | 0.4978 | — | — | — |
| 11.5 | Si/[(PSS/PAH)$_{11}$/PSS] | — | 84.9 ± 2.4 | 7.4 ± 0.2 | 1.31 ± 0.13 |
| 12 | Q/[(PSS/PAH)$_{12}$] | 0.7426 | — | — | — |
| 12 | Si/[(PSS/PAH)$_{12}$] | — | 87.1 ± 1.7 | 7.3 ± 0.1 | 0.89 ± 0.13 |
| 13 | Q/[(PSS/PAH)$_{13}$] | 0.8028 | — | — | — |
| 15.5 | Si/[(PSS/PAH)$_{15}$/PSS] | — | 113.6 ± 1.3 | 7.33 ± 0.08 | 1.4 ± 0.2 |
| 16 | Q/[(PSS/PAH)$_{16}$] | 0.9611 | — | — | — |
| 16 | Si/[(PSS/PAH)$_{16}$] | — | 117.6 ± 1.3 | 7.35 ± 0.06 | 0.99 ± 0.08 |
| 19.5 | Si/[(PSS/PAH)$_{19}$/PSS] | — | 147.6 ± 2.3 | 7.6 ± 0.1 | 1.34 ± 0.34 |
| 20 | Q/[(PSS/PAH)$_{20}$] | 1.2425 | — | — | — |
| 20 | Si/[(PSS/PAH)$_{20}$] | — | 151.5 ± 1.9 | 1.9 | 1.22 ± 0.09 |

[a]Number of PSS/PAH bilayers deposited from 0.04M Na$_2$SO$_4$/0.88M NaCl (aq) solution.
[b]Identity of the substrate coated with the multilayer. Q = quartz and Si = silicon wafer. Substrates were coated with a chemisorbed EDA organosiloxane monolayer prior to multilayer deposition. Multilayer films have structure: Substrate-EDA/(PSS/PAH)$_x$ (x = 20 for quartz (Q) and x = 24 for silicon (Si) substrates).
[c]PSS and PAH layer structure of the multilayer film identified by the bilayer code in column 1. The EDA monolayer on the Q and Si substrates is omitted for clarity.
[d]UV absorbance of the multilayer film at 225 nm on a quartz substrate.
[e]Thickness (±std. dev.) of the multilayer film as determined by AFM.
[f]Average thickness (±std. dev.) of a single PSS/PAH bilayer within the multilayer film, calculated by dividing the total film thickness (column 4) by the number of bilayers deposited (column 1).
[g]Root-mean-square roughness, $r_q$, (±std. dev.) from AFM measurements at three film surface sites.

Example 12

TEM Strata Imaging

Figure 11:
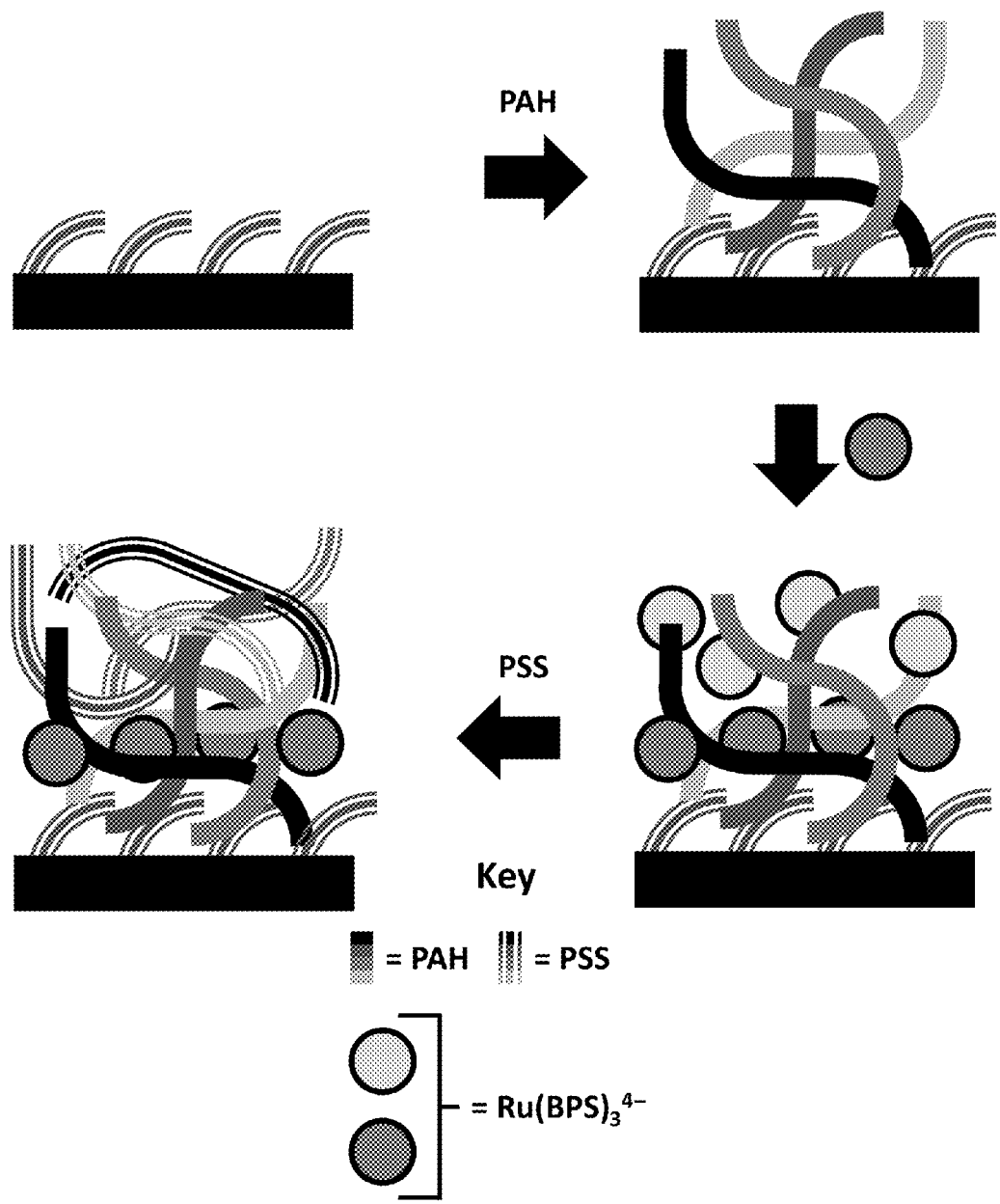
FIG. 11 shows a model for fabrication of PEMLs comprising PSS and $Ru(BPS)_3^{4-}$ dye-stained PAH. The model illustrates deposition of a single PSS/PAH/Ru trilayer. Weakly and strongly adsorbed $Ru(BPS)_3^{4-}$ dye species are indicated by light and dark spheres, respectively. Additional information is contained in FIG. 5 and Table 8. (The various shades of polyelectrolyte strands serve solely to illustrate the chain entanglement described by the model.)

To observe the linear growth regime by direct TEM imaging, PEMLs with PAH layers stained by Ru(BPS)$_3$[4−] shown in FIGS. 5B,C, 10, and 11 were prepared. The protocol used to deposit PEMLs for FIG. 5A (Table 5) was modified by treating each PAH layer with Ru(BPS)$_3$[4−] (aq) solution to electrostatically bind Ru(BPS)$_3$[4−] dye to the PAH protonated amine sites (Table 8). Subsequent treatment of the film with fresh PSS solution displaced ca. 46±5% of the bound dye from the PAH (FIG. 5B, Table 8). However, as expected, addition of PAH to begin the next deposition cycle did not displace the strongly bound PSS from the films (FIG. 11, Table 8).

TABLE 8

Absorbance Data for PAH/PSS/Ru(bathophenanthrolinesulfonate)$_3$[4−] Trilayer-based Multilayer Films Associated with FIGS. 5B and C

| Row | Trilayer No.[a] | Film Structure[b] | Abs.[c] (225 nm) | Abs.[c] (286 nm) | Abs.[c] (464 nm) |
|---|---|---|---|---|---|
| 1[d,e] | 3 | [(PSS/PAH/Ru[f])$_3$/PSS/PAH] | 0.37026 | 0.303833 | 0.093956 |
| 2[e,g] | 4 | [(PSS/PAH/Ru)$_4$] | 0.494527 | 0.461827 | 0.147875 |
| 3[g,h] | 4 | [(PSS/PAH/Ru)$_4$/PSS] | 0.468506 | 0.392885 | 0.127366 |
| 4[d,h] | 4 | [(PSS/PAH/Ru)$_4$/PSS/PAH] | 0.454794 | 0.385262 | 0.127633 |
| 5[d] | 7 | [(PSS/PAH/Ru)$_7$/PSS/PAH] | 0.792142 | 0.597925 | 0.20253 |
| 6[d] | 8 | [(PSS/PAH/Ru)$_8$/PSS/PAH] | 0.933085 | 0.704562 | 0.224804 |
| 7[d] | 9 | [(PSS/PAH/Ru)$_9$/PSS/PAH] | 1.0654 | 0.818163 | 0.242362 |
| 8[h] | 10 | [(PSS/PAH/Ru)$_{10}$/PSS] | 1.185596 | 0.917511 | 0.259185 |
| 9[d,e,h] | 10 | [(PSS/PAH/Ru)$_{10}$/PSS/PAH] | 1.176532 | 0.917933 | 0.254785 |
| 10[e,g] | 11 | [(PSS/PAH/Ru)$_{11}$] | 1.320172 | 1.101638 | 0.291548 |
| 11[g,h] | 11 | [(PSS/PAH/Ru)$_{11}$/PSS] | 1.29084 | 1.028493 | 0.273427 |
| 12[d,h] | 11 | [(PSS/PAH/Ru)$_{11}$/PSS/PAH] | 1.284034 | 1.021332 | 0.271213 |
| 13[d] | 12 | [(PSS/PAH/Ru)$_{12}$/PSS/PAH] | 1.399545 | 1.117805 | 0.293125 |
| 14[d] | 13 | [(PSS/PAH/Ru)$_{13}$/PSS/PAH] | 1.526528 | 1.22435 | 0.314943 |
| 15[d] | 16 | [(PSS/PAH/Ru)$_{16}$/PSS/PAH] | 1.910164 | 1.481669 | 0.397298 |
| 16[d] | 16 | [(PSS/PAH/Ru)$_{16}$/PSS/PAH] | 1.907305 | 1.478812 | 0.398347 |
| 17[d] | 16 | [(PSS/PAH/Ru)$_{16}$/PSS/PAH] | 1.908482 | 1.479037 | 0.403783 |
| 18[d] | 18 | [(PSS/PAH/Ru)$_{18}$/PSS/PAH] | 2.14154 | 1.679246 | 0.474377 |

TABLE 8-continued

Absorbance Data for PAH/PSS/Ru(bathophenanthrolinesulfonate)$_3^{4-}$ Trilayer-based Multilayer Films Associated with FIGS. 5B and C

| Row | Trilayer No.[a] | Film Structure[b] | Abs.[c] (225 nm) | Abs.[c] (286 nm) | Abs.[c] (464 nm) |
|---|---|---|---|---|---|
| 19[d,e] | 19 | [(PSS/PAH/Ru)$_{19}$/PSS/PAH] | 2.266959 | 1.79541 | 0.509651 |
| 20[e] | 20 | [(PSS/PAH/Ru)$_{20}$] | 2.434432 | 1.978641 | 0.565566 |

[a]Number of PAH/PSS/Ru(bathophenanthrolinesulfonate)$_3^{4-}$ trilayers present in the film.
[b]Internal structure of the multilayer film on the EDA-coated quartz slide (not shown). Polyelectrolyte layers were deposited from separate solutions containing 2 mg PSS or PAH/mL of 0.04M Na$_2$SO$_4$/0.85M NaCl solution. Polyelectrolyte layers were sequentially rinsed using 0.04M Na$_2$SO$_4$/0.85M NaCl solution, 1.00M NaCl solution, and water according to the salt rinse protocol. The Ru deposition solution comprised 2 mg Na$_4$ Ru(bathophenanthrolinesulfonate)$_3$/mL water. The Ru layers were triple rinsed in water. Films were dried in a filtered N$_2$ gas stream after deposition of each layer.
[c]UV-visible film absorbance of the indicated wavelength. Uncertainty is ±0.005 abs. units.
[d]Data for films in these rows are used to prepare the plot shown in FIG. 5C.
[e]Comparison of data in adjacent rows marked "e" indicates the effect on absorbance of the addition of a Ru layer to a film terminated by a PAH layer, e.g., rows 1 vs. 2, 9 vs. 10.
[f]"Ru" represents the Ru(bathophenanthrolinesulfonate)$_3^{4-}$ transition metal complex ion, where bathophenanthrolinesulfonate is 4,7-di-(m-sulfonatophenyl)-1,10-phenanthroline, in each film structure.
[g]Comparison of data in adjacent rows marked "g" indicates the effect on film absorbance of the addition of a PSS layer to the multilayer film terminated by a Ru layer, e.g., rows 2 vs. 3.
[h]Comparison of data in adjacent rows marked "h" indicates the effect on film absorbance of the addition of a PAH layer to the multilayer film terminated by a PSS layer, e.g., rows 3 vs. 4.

Figure 10:
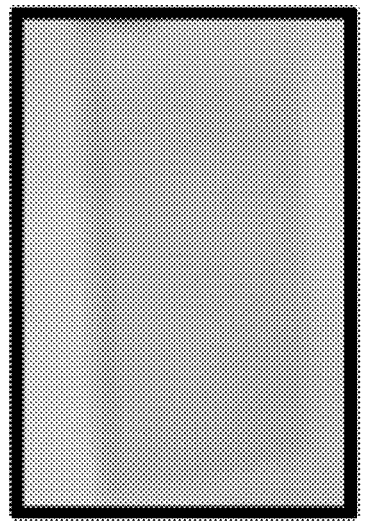
FIG. 10 shows a quartz slide (left) coated by a PEML of structure Q-EDA/(PSS/PAH/Ru)$_{20}$ (where Ru≡ $Ru(BPS)_3^{4-}$) and a Si wafer (right) coated by a Si-EDA/(PSS/PAH/Ru)$_{19}$/PSS/PAH PEML are shown. The coated quartz slide exhibits the orange-yellow color associated with the $Ru(BPS)_3^{4-}$ chromophore. The PEML coated onto the Si wafer exhibits a green-yellow interference color reflecting contributions from the $Ru(BPS)_3^{4-}$ chromophore absorbance and the total PEML thickness. Both the coated quartz slide and Si wafer exhibit the characteristic red-orange emission during excitation at 254 nm associated with the $Ru(BPS)_3^{4-}$ MLCT excited state. Note the reflection of the quartz slide emission in the Fluoroware™ container. Additional information is presented in Table 8 and FIGS. 5B and 3C.
Figure 10:
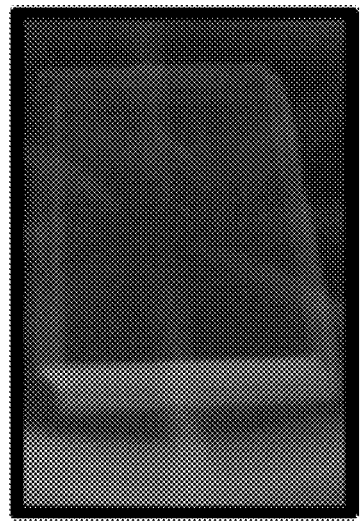
Figure 10:
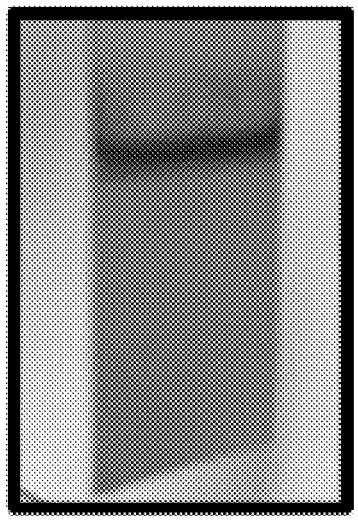
Figure 10:
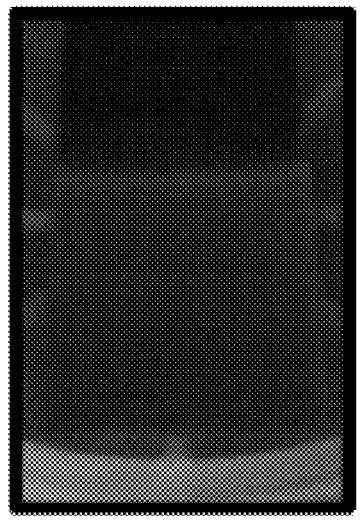

Despite the partial displacement of Ru(BPS)$_3^{4-}$ dye during PSS deposition, the analysis of absorbance data at 225 nm, 286 nm, and 460 nm in FIG. 5C indicates robust and linear deposition of PEMLs comprising PSS/PAH/Ru trilayers, in which the Ru complex is incorporated without degradation (FIG. 10). The linearity of the A$_{225}$ plot, which tracks both PSS and Ru(BPS)$_3^{4-}$ dye, indicates a linear growth similar to that of the corresponding PSS/PAH film in FIG. 5A. Incorporation of the Ru dye does not significantly change the film roughness, but increases the thickness of the repeating unit (ca. 9.0±0.2 nm for PSS/PAH/Ru trilayers vs 7.6±0.1 nm for PSS/PAH bilayers).

Figure 12:
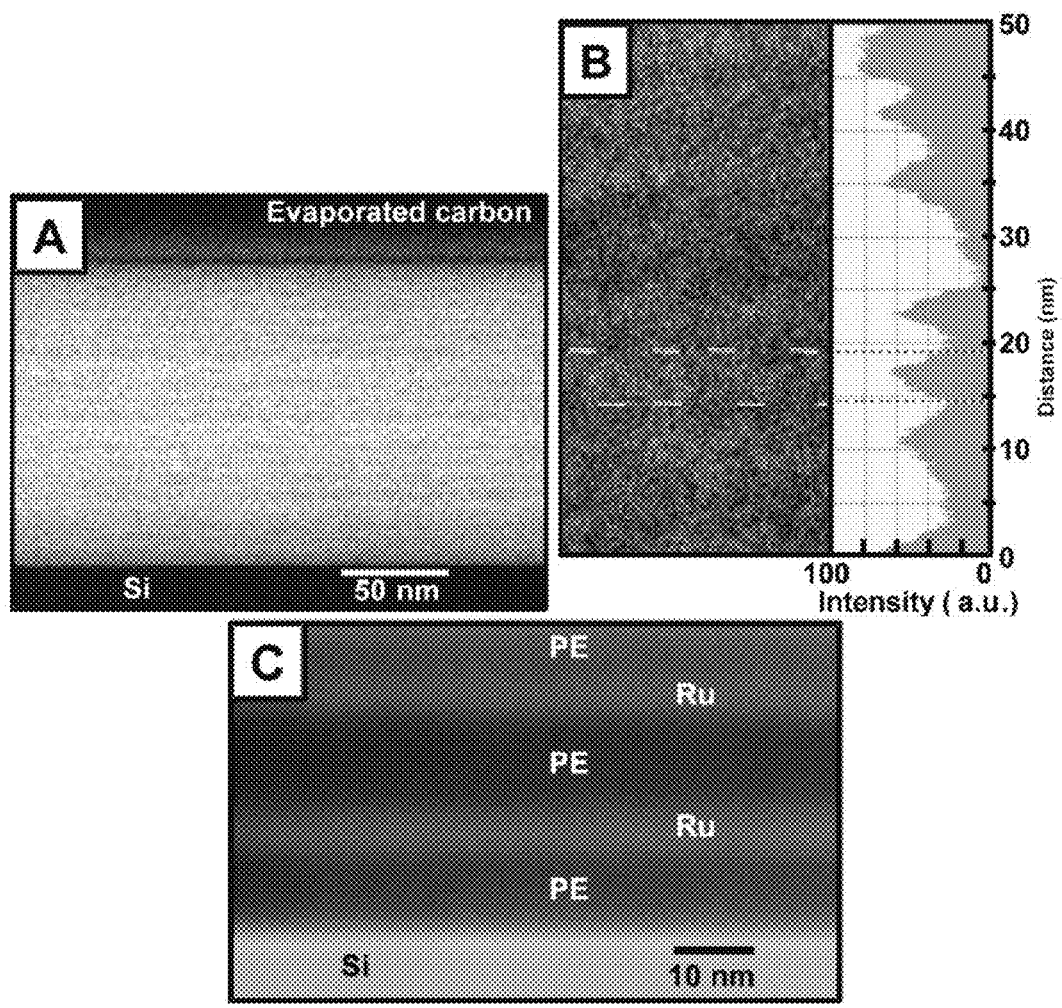
FIG. 12 shows (A) STEM-HAADF of a cross section of a Si-EDA/(PSS/PAH/Ru)$_{20}$ PEML. Polyelectrolyte-rich and Ru dye-rich areas are indicated by dark and light bands, respectively, in the strata. (B) Cross section analysis of the strata indicating the variation in levels of the Ru dye perpendicular to the plane of the strata through integrated intensity measurements that show confinement of the $Ru(BPS)_3^{4-}$ dye complex to specific strata. (C) STEM-HAADF of a cross section of a Si-EDA/[(PSS/PAH)$_5$Ru]$_2$/(PSS/PAH)$_4$ PEML showing isolated, intact Ru layers separated by four PSS/PAH bilayers. PSS and PAH depositions for the PEMLs were made using 0.04 M $Na_2SO_4$/0.88 M NaCl (aq) polyelectrolyte solutions with the salt rinse protocol, whereas Na$_4$Ru(BPS)$_3$ was deposited from aqueous solution using the water rinse protocol.

The STEM-HAADF image of the cross section of a Si-EDA/(PSS/PAH/Ru)$_{20}$ PEML is shown in FIG. 12. Uniform periodic strata comprising darker polyelectrolyte-rich (lower atomic number, Z) and lighter Ru-rich (higher Z) bands indicative of linear PEML growth are observed. The fwhm of the lighter bands in FIG. 12A provides an estimated thickness of ca. 4.0±0.5 nm for the Ru(BPS)$_3^{4-}$ dye-stained PAH regions, which corresponds to 44±6%, i.e., a significant fraction, of each PSS/PAH/Ru trilayer. The validity of this estimate requires negligible diffusion of the Ru dye within the PEML stack, an assumption that was tested by fabricating a Si-EDA/[(PSS/PAH)$_5$Ru]$_2$/(PSS/PAH)4 film in which every fifth PSS/PAH bilayer is stained with Ru(BPS)$_3^{4-}$ dye (FIG. 12C). Discrete Ru-stained light bands of ca. 5±1 nm thickness separated by the intervening PSS/PAH bilayer stacks are clearly observed in FIG. 12C, supporting the assumption of the limited Ru(BPS)$_3^{4-}$ dye diffusion within the PEML.

Example 13

Surface Morphology

Figure 2:
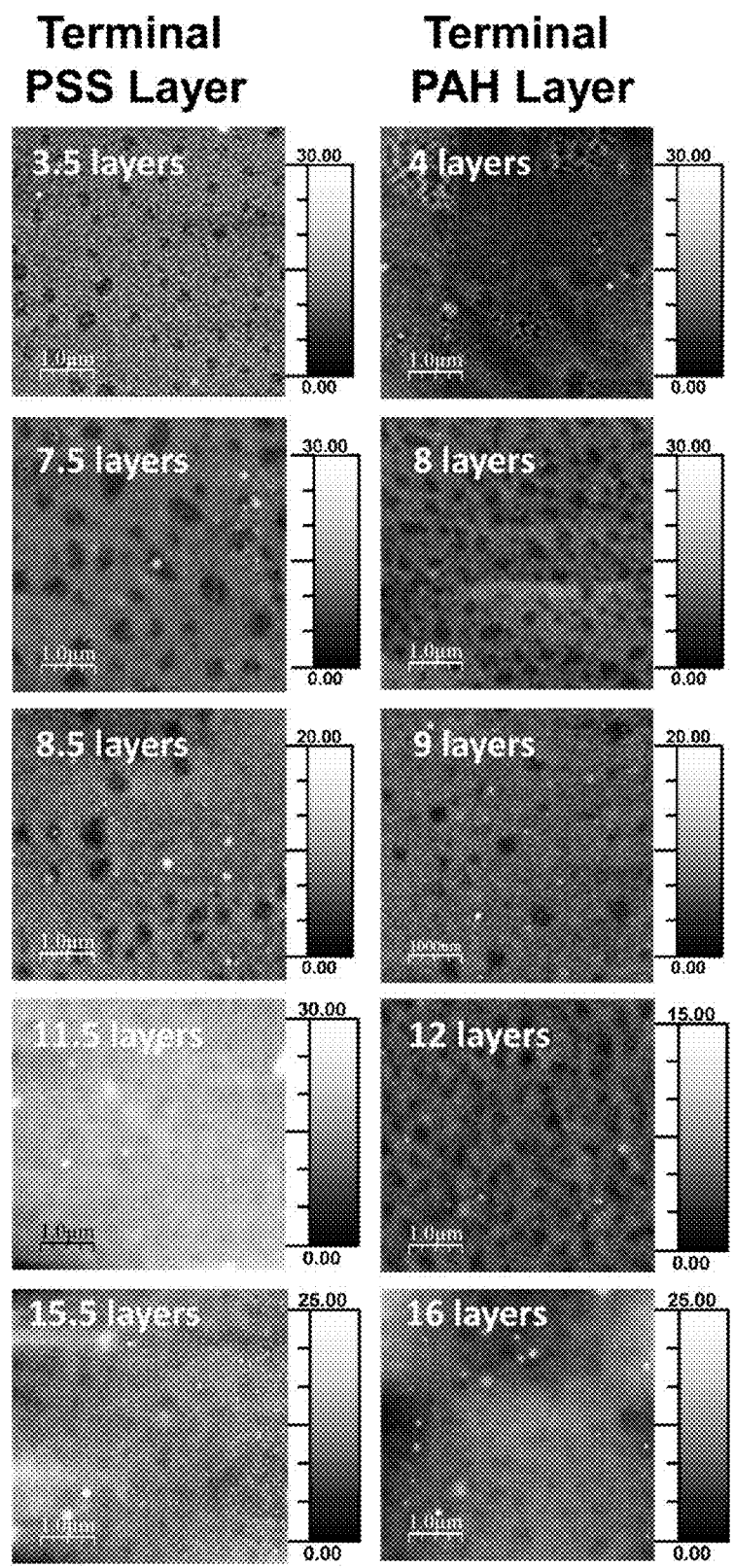
FIG. 2 shows atomic force microscopy (AFM) scans of the PSS/PAH PEMLs as functions of the number of PSS/PAH bilayers deposited from 0.04 M $Na_2SO_4$/0.88 M NaCl (aq) polyelectrolyte solutions with the salt rinse protocol described in Example 4 (note Table 7).

Examination of the topography of the PEMLs described in Table 7 and FIG. 5A reveals additional information concerning the structure of these films. FIG. 2 illustrates AFM scans at intermediate stages during fabrication of PEMLs from 0.04 M Na$_2$SO$_4$/0.88 M NaCl solutions on a Si-EDA substrate. The PEML surface exhibits two distinct morphologies: for films having <9 PSS/PAH bilayers, "void" defects (represented by dark patches in the images) indicative of the incomplete or irregular film deposition are clearly observed, whereas deposition of additional polyelectrolyte layers results in noticeably smoother films exhibiting an "orange-peel" morphology.

Specifically, large defects with sizes of ca. 200-400 nm and depths of ca. 4-8 nm are observed for films having ≤4 PSS/PAH bilayers. After deposition of ca. 8 PSS/PAH bilayers, defects become shallower, with depths of ca. 3-6 nm. For films with ≥12 PSS/PAH bilayers, defect diameters decrease to ca. 100-250 nm and depths to ca. 1-2 nm. These morphological changes suggest a transition from initial electrostatic adsorption of intact polyelectrolyte solution aggregates (FIG. 8, Table 4) to their more homogeneous and uniform packing, whereby a more uniform film roughness is produced via partial healing of defects.

It is noted that the TEM and AFM data in FIGS. 2 and 12 provide complementary information but characterize different aspects of the PEML formation. The AFM measurements probe the conformation of the outermost polyelectrolyte layer of a growing film, while the TEM measurements examine a 100-nm-thick cross section of a completed equilibrium film. Any healing processes should have occurred in the completed film, and consequently, the absence of large subsurface voids in TEM images is not surprising.

Example 14

Testing the Anion Bridging Model

The model summarized in FIG. 1 provides several specific predictions. Linear correlations of PEML thickness and absorbance are expected for anions capable of electrostatically bridging protonated amines on PAH chains. The basis for this linear correlation for a given anion should be provided by tandem increases of absorbance and thickness with the anion concentration. In addition, linear thickness-absorbance correlations are expected for a series of different anions at fixed identical concentrations because the influence of an anion must depend only on its bridging ability. These predictions were confirmed in the systematic experiments summarized in FIG. 13.

FIG. 13A presents thickness vs absorbance data for PEMLs prepared from solutions containing univalent anions which are incapable of bridging PAH amine sites. As predicted, in the absence of bridging the PEMLs exhibit identical absorbance and thickness values. In contrast, FIG. 13B shows the thickness-absorbance correlation plot for PEMLs prepared from solutions containing varying $SO_4^{2-}$ levels (FIG. 4B, Table 6). As predicted, a linear correlation is observed, whereby absorbance and thickness of the films increase with solution [$SO_4^{2-}$].

FIG. 13B also shows results for films prepared using solutions containing $HPO_4^{2-}$ (MP) or $Mg^{2+}$ ions (i.e., Mg(CL) and Mg(S)). The position of the $HPO_4^{2-}$ (MP) data point on the line defined by the [$SO_4^{2-}$] data clearly indicates that the correlation is independent of bridging anion type, as predicted by the model. The $Mg^{2+}$ data confirm the previous conclusion that, in contrast to the divalent $SO_4^{2-}$ anions, divalent $Mg^{2+}$ cations do not exhibit any apparent bridging activity, as PEMLs prepared using 0.05 M $MgCl_2$ solution (i.e., Mg(CL)) exhibit absorbance and thickness values equivalent to those associated with the univalent salts of FIG. 13A. In fact, the presence of $Mg^{2+}$ has an antagonistic effect on the activity of $SO_4^{2-}$. PEMLs prepared using 0.05 M $MgSO_4$ solution (i.e., Mg(S)) are similar to films prepared using 0.04 M $Na_2SO_4$/0.88 M NaCl solution, i.e., an additional amount of $SO_4^{2-}$ is required to compensate for the presence of $Mg^{2+}$, consistent with the known contact association of $Mg^{2+}$ and $SO_4^{2-}$ in aqueous solution.

FIG. 13C shows the predicted linear thickness-absorbance correlation for PEMLs prepared from solutions containing 0.05 M levels of different bridging dicarboxylate anions. The mechanism outlined in FIG. 1 can be generalized to these organic dianions, as they maintain their charges at the deposition solution pH (Tables 3 and 3) and are not materially incorporated into PEML films (IR absorbance characteristic of COO— species is not observed for the PEMLs).

Example 15

Anion Structure Effects

Figure 13:
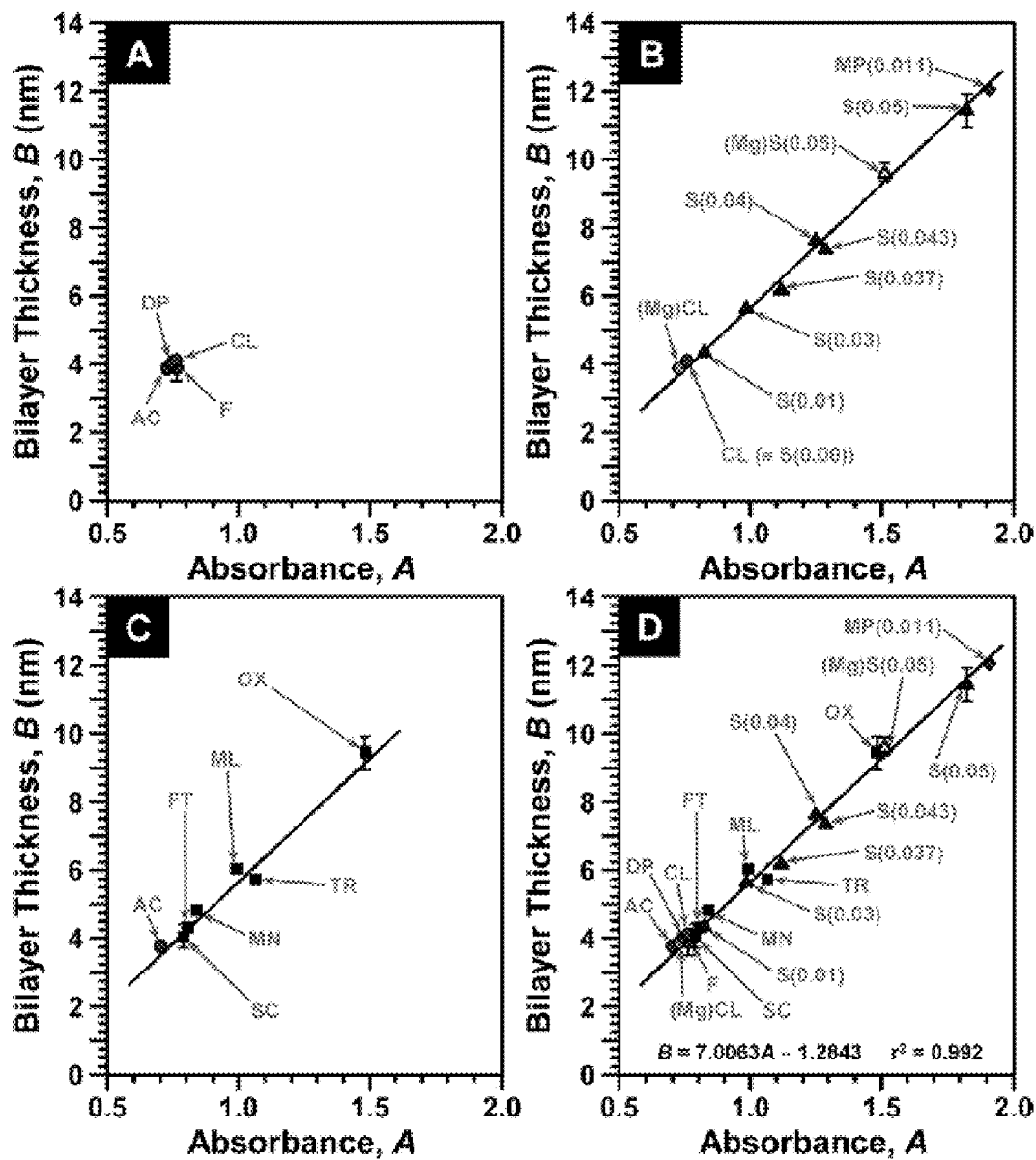
FIG. 13 shows correlation between thickness and absorbance of PSS/PAH PEMLs. Absorbance values are from Q-EDA/(PSS/PAH)$_{20}$ films and bilayer thickness values are calculated as ¹⁄₂₄th of the total thickness of the corresponding Si-EDA/(PSS/PAH)$_{24}$ films. (A) Series of 0.05 M univalent anions: Cl$^-$ (CL), F$^-$ (F), acetate (AC), and H$_2$PO$_4^-$ (DP). (B) Data for different solution concentration of $SO_4^{2-}$ (S) (triangles represent $Na^+$ and $Mg^{2+}$ salts) shown with: CL as a $[SO_4^{2-}]=0.00$ M control (upper circle), $MgCl_2$ [(Mg)CL, lower circle] for estimation of the effect of $Mg^{2+}$ vs $Na^+$, and the ca. 0.011 M $HPO_4^{2-}$ result [(MP), diamond]. The number in parentheses after an anion symbol indicates the molar anion concentration in the PEML deposition solutions. (C) Dicarboxylate anion dependence (black squares) at 0.05 M solution levels for oxalate (OX), maleate (ML), tartrate (TR), malonate (MN), fumarate (FT), and succinate (SC) shown with the univalent 0.05 M AC control (circle). (D) Composite plot of all data showing the universal linear correlation.

In the data summarized in FIG. 13, there is clear evidence that the structure of both inorganic and organic anions (FIG. 7) affects their ability to bridge PAH chains. For example, both $C_2O_4^{2-}$ and $HPO_4^{2-}$ possess two anionic sites fixed at angles similar to the S—$O^-$ sites in $SO_4^{2-}$ (FIG. 7). However, $HPO_4^{2-}$ (MP), even at ca. 0.011 M concentration (chosen to be below the gel formation threshold), produced thicker films than did either $SO_4^{2-}$ (S) or $C_2O_4^{2-}$ (OX) at 0.05 M (FIG. 13B) levels. This behavior suggests that the bridging functionality of $HPO_4^{2-}$ is much greater than that of $SO_4^{2-}$, whereas $SO_4^{2-}$ and $C_2O_4^{2-}$ are similarly efficient (with the larger size of $C_2O_4^{2-}$ likely accounting for its lower efficiency (vide infra)). It is possible that the enhanced efficiency of $HPO_4^{2-}$ is related to a potential third anionic P—$O^-$ site in its structure (FIG. 7). In the absence of PAH, the third P—OH site is not ionized under the experimental conditions. After binding to the protonated PAH chain via the two P—$O^-$ sites, however, the third P—OH site may spontaneously deprotonate to permit additional electrostatic interaction in a process similar to proximity effect $pK_a$ reduction observed in SAMs compared to solution-phase molecules. The extreme pH sensitivity of the $HPO_4^{2-}$ bridging phenomenon, which is quenched via addition of a proton to form $H_2PO_4^-$ (MP vs DP in FIG. 13D), is consistent with such a putative mechanism.

The series of dicarboxylates analyzed in FIG. 13C was designed to systematically investigate the effects of specific structural parameters on the bridging behavior of dianions. Specifically, the separation between the carboxylate sites and the rigidity of the dianions were systematically varied, and additional noncovalent interactions were introduced to stabilize the bridging (FIG. 7). In particular, PEMLs deposited in the presence of oxalate (OX) are comparable to the reference films deposited with $SO_4^{2-}$ (S), making oxalate a convenient benchmark for performance of other dicarboxylates in FIG. 13C. In fumarate (FT), the angle between C—$O^-$ sites is essentially the same as in oxalate, but their physical separation is increased, which results in a dramatic decrease in PEML thickness. In contrast, maleate (MT), an isomer of fumarate with rigid cis-conformation and smaller separation of carboxylate groups, is about half as efficient as oxalate in increasing the film thickness compared to univalent anions. In a similar fashion, decreasing the carboxylate separation in a flexible dicarboxylate species enhances film absorbance and thickness, albeit modestly, as can be seen by comparing malonate (MN) and fumarate PEMLs.

The effect of changing the rigidity is most pronounced in comparing maleate to succinate (SC), in which C—$O^-$ sites are connected much less rigidly by a pair of methylene groups. As a result, succinate produces the lowest PEML thickness among the dicarboxylates in FIG. 13C. This apparently weak bridging of PAH chains by succinate at $\mu=1$ M is in sharp contrast to the reported strong PAH . . . SC interactions that promote rapid gelation at $\mu \rightarrow 0$ highlighting the importance of the solution ionic strength for controlling the nucleation and stability of PAH aggregates, which provide the basis for the PEML deposition approach.

The apparently weak bridging activity of succinate also suggests introduction of functional groups that are capable of supplementing electrostatic bridging by additional noncovalent interactions within the PAH aggregate. The carboxylate groups of tartrate (TR) are separated by a flexible two-carbon chain analogous to succinate. However, the presence of a single hydroxyl group on each of the carbon atoms in the chain dramatically increases film absorbance and thickness to levels rivaling maleate, i.e., overcoming the penalty to the bridging activity due to chain flexibility.

The behavior of PEMLs fabricated using the dicarboxylate species clearly indicates that factors such as size and rigidity of the bridging anion, together with the angle presented by its negatively charged bridging sites, are important in controlling the PAH aggregate properties required for PEML fabrication using the methods. Smaller anions having (at least) two closely spaced bridging sites that are rigidly fixed at an obtuse angle are best structured to provide optimal bridging behavior and PEML deposition following the model in FIG. 1. Combining the data from FIG. 13A,B,C as a single plot in FIG. 13D demonstrates the universal PEML thickness-absorbance correlation predicted by the anion-bridging model of FIG. 1, which thus provides a convenient, simple, and efficient means to describe the deposition of PSS/PAH multilayers in the presence of bridging divalent anions.

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A method comprising:
   contacting a substrate with a first solution comprising a first polyelectrolyte polymer to form a layer of the first polyelectrolyte polymer on the substrate;
      wherein the first polyelectrolyte polymer is a polyanion or polycation polymer; and
   contacting the layer of the first polyelectrolyte polymer with a second solution comprising a second polyelectrolyte polymer to form a layer of the second polyelectrolyte polymer on the layer of the first polyelectrolyte polymer;

wherein the second polyelectrolyte polymer is a polyanion or polycation polymer of a charge opposite to that of the first polyelectrolyte polymer;

wherein at least one of the first solution or the second solution is an aggregate-forming solution comprising an ionic species having at least two discrete sites of a charge opposite to that of the polyelectrolyte polymer in the aggregate-forming solution; and wherein the ionic species forms, via bridging interactions, aggregates of the polyelectrolyte polymer that remain intact in the aggregate-forming solution and at least partially intact during the contact and layer formation.

2. The method of claim 1, further comprising:
depositing on the layer of the second polyelectrolyte polymer one or more alternating layers of the first polyelectrolyte polymer using the first solution and the second polyelectrolyte polymer using the second solution.

3. The method of claim 1;
wherein the aggregate-forming solution comprises the polycation polymer; and
wherein the ionic species is an anion having two or more discrete fixed negatively-charged sites.

4. The method of claim 3, wherein the method forms a multilayer structure having internal pores and comprised of layers of stacked polycation aggregates separated and held together by layers of polyanion.

5. The method of claim 1, wherein the polycation polymer is polyallylamine hydrochloride.

6. The method of claim 1, wherein the polycation polymer is polydiallyldimethylammonium chloride, a protonated polyvinylpyridine, or a polyvinylpyridinium salt.

7. The method of claim 1, wherein the ionic species is $SO_4^{-2}$, $HPO_4^{-2}$, or an organic dicarboxylate.

8. The method of claim 1, wherein the polyanion polymer is sodium polystyrene sulfonate, sodium polyacrylate, sodium polymethacrylate, sodium polyvinylsulfate, or sodium polyvinylsulfonate.

9. The method of claim 1, wherein the aggregate-forming solution is the second solution.

10. The method of claim 1, wherein the substrate is a silicon or quartz substrate having a self-assembled monolayer of chemisorbed organosiloxane, aminosiloxane, alkylamine siloxane, N-(2-aminoethyl)-3-aminoalkyltrimethoxysilane, N-(2-aminoethyl)-3-aminobutyltrimethoxysilane, or N-(2-aminoethyl)-3-aminoalkyltrimethoxysilane.

11. The method of claim 1;
wherein the aggregate-forming solution comprises the polyanionic polymer; and
wherein the ionic species is an cation having two or more discrete positively-charged sites.

12. The method of claim 11;
wherein the ionic species is $^+H_3N-CH_2-CH_2-NH_3^+$; and
wherein the substrate is a bare silicon or quartz substrate.

13. The method of claim 11, wherein the method forms a multilayer structure having internal pores and comprised of layers of stacked polyanion aggregates separated and held together by layers of polycation.

14. The method of claim 1, further comprising:
rinsing the layer formed from the aggregate-forming solution with, in order:
1) a polyelectrolyte-free solution comprising the ionic species;
2) a salt solution having an ionic strength within 10% of that of the aggregate-forming solution; and
3) water.

15. The method of claim 1, further comprising:
rinsing the layer formed from the aggregate-forming solution with water three times.

16. The method of claim 1, further comprising:
depositing a dye on a layer of polyelectrolyte.

* * * * *